PULSE COMMUNICATION SYSTEM

Filed Nov. 30, 1956 10 Sheets-Sheet 1

INVENTOR
SIDNEY W. LEWINTER
BY Alfred C. Hill
AGENT

Dec. 4, 1962 S. W. LEWINTER 3,067,291

PULSE COMMUNICATION SYSTEM

Filed Nov. 30, 1956 10 Sheets-Sheet 2

INVENTOR
SIDNEY W. LEWINTER
BY Alfred C. Hill
AGENT

Dec. 4, 1962 S. W. LEWINTER 3,067,291

PULSE COMMUNICATION SYSTEM

Filed Nov. 30, 1956 10 Sheets-Sheet 3

INVENTOR
SIDNEY W. LEWINTER
BY Alfred C. Hill
AGENT

Dec. 4, 1962 S. W. LEWINTER 3,067,291

PULSE COMMUNICATION SYSTEM

Filed Nov. 30, 1956 10 Sheets-Sheet 4

INVENTOR
SIDNEY W. LEWINTER
BY Alfred C. Hill
AGENT

Dec. 4, 1962 S. W. LEWINTER 3,067,291

PULSE COMMUNICATION SYSTEM

Filed Nov. 30, 1956 10 Sheets-Sheet 5

INVENTOR
SIDNEY W. LEWINTER
BY Alfred C. Hill
AGENT

INVENTOR
SIDNEY W. LEWINTER
BY Alfred C. Hill
AGENT

INVENTOR
SIDNEY W. LEWINTER
BY Alfred C. Hill
AGENT

INVENTOR
SIDNEY W. LEWINTER
BY Alfred C. Hill
AGENT

INVENTOR
SIDNEY W. LEWINTER
BY Alfred C. Hill
AGENT

INVENTOR
SIDNEY W. LEWINTER
BY Alfred C. Hill
AGENT 3,067,291
PULSE COMMUNICATION SYSTEM
Sidney W. Lewinter, Verona, N.J., assignor to International Telephone and Telegraph Corporation, Nutley, N.J., a corporation of Maryland
Filed Nov. 30, 1956, Ser. No. 625,385
17 Claims. (Cl. 179—15)

This invention relates to pulse communication systems and particularly to a pulse communication system of the pulse code modulation (PCM) type.

It is known that PCM offers the possibility of obtaining secret communication of voice signals. Since this is a consequence of its on-off nature, it is superior in this respect to other conventional systems of pulse modulation, such as pulse amplitude modulation (PAM) and pulse time modulation (PTM). Heretofore, the chief objection to PCM has been its complexity. For a system having from 24 to 48 channels, PCM has required about three times as much equipment as PTM. Furthermore, a large portion of the PCM equipment has consisted of circuitry common to all signal channels. This common circuitry does not simplify significantly if the number of channels in the system were reduced by any moderate amount. The "overhead," so to speak, of a PCM system has been very high.

An object of this invention is to provide an improved PCM communication system.

Another object of this invention is to provide a simplified PCM communication system which is less complex and employs less equipment than previous known PCM communication systems.

Still another object of this invention is to provide improved system components and techniques for transmitting a plurality of intelligence signals by PCM which enable the achievement of a simplified PCM communication system.

A feature of this invention is the provision of an improved means to accomplish synchronization and framing of a distant demultiplexer with the multiplexer. In accordance with this feature a pulse having a width of one code element is inserted in every other frame of the output signal of the multiplexer thereby producing for this pulse a repetition frequency equal to one half the repetition frequency of a single frame. The signal input to the demultiplexer is coupled to the demultiplexer synchronizer and timing generator which generates the necessary timing pulses for demodulation correctly phased with respect to the one half frame rate pulse included in the multiplexed signal. This timing generator includes a plurality of reflective delay lines and auxiliary shaping circuits cooperating to produce the necessary timing signals. The reflective delay lines employed act as a resonant element resonant to a particular combination of time varying signals with the result that the delay lines will resonate or produce an output in the presence of the half frame rate pulse and no other PCM signal. As a consequence of this behavior, the timing signals are automatically phase referenced to the half frame rate or marker pulse.

Another feature of this invention is the provision of an improved means of time division multiplexing a plurality of channel signals in PCM systems. In accordance with this feature each of a plurality of intelligence signals are translated to a code signal including a plurality or group of code elements or digits, each element having a given weight. The resultant channel code groups are then acted upon so that the highest weight code elements of each channel are sent in succession. Then the next highest weight code elements of each channel are sent in succession. This continues until the full frame is completed.

This type of time division multiplexer will hereinafter be referred to as digit interlace multiplex.

Still another feature of this invention is the provision of a simplified method of coding audio signals. In accordance with this feature the geometry of a coding raster is employed. The polarity of an audio signal with respect to the center line to a code raster is recognized. The code raster is then effectively bisected. The audio signal is then translated to the upper half of the bisected code raster. The bisection and translation on the portion of the code raster left above the bisection point is successively repeated $n-1$ times for an $n$ digit code. The polarity of the input signal relative to the bisection line provides an on and off indication as derived from this recognized polarity to form the code group indicative of the amplitude of the audio signal at the time of sampling. Further in accordance with this feature several embodiments are disclosed to carry out the above-method wherein the resulting code is in the binary notation and also where the resulting code is in the inverted binary or cyclic progression (CP) notation. Still further in accordance with this feature the coding circuits disclosed convert audio signals directly to PCM signals eliminating the heretofore employed intermediate step of converting to PAM signals and then to PCM.

A further feature of this invention is the provision of a simplified decoder having one of its characteristics complementary to those of the coder of this invention in operating to convert PCM signals directly to audio signals without the usual intermediate PAM step.

Still a further feature of this invention is the provision of a simplified compander cooperating to simplify the PCM communication system of this invention. In accordance with this feature a compressor and expander, each including one stage, is provided which has a two-slope straight-line characteristic to accomplish the necessary compression and expansion in the PCM system of this invention.

The above-mentioned and other features and objects of this invention will become more apparent by reference to the following description taken in conjunction with the accompanying drawings, in which.

*System*

Figure 1:
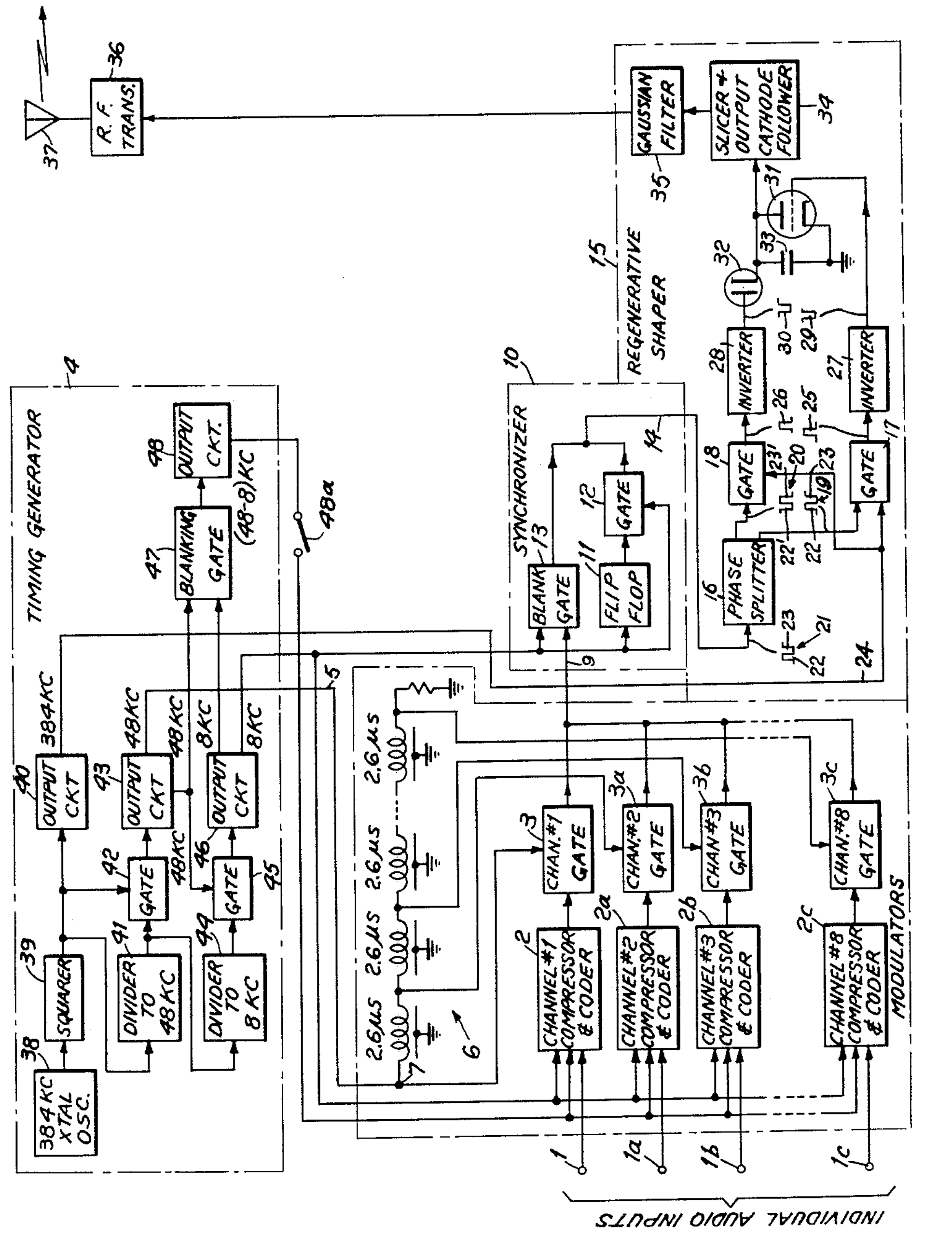
FIG. 1 illustrates in block diagram form the transmitter side of a PCM system in accordance with this invention.

In past multiplex PCM systems, it has been the practice to include equipment which converts a plurality of audio signals to multiplex PAM signals and then convert the PAM signals to multiplex PCM signals. At the demodulator, the sequence is reversed. Effectively, there is a complete multiplex PAM system in addition to the PCM equipment. The complexity of the PCM system would be substantially reduced if this system within a system could be eliminated. The system about to be described will enable the achievement of this reduction in equipment complexity by employing channel circuitry therein which would convert audio signals directly to PCM channel signals and the outputs of several such channel circuits would be interleaved in time to provide a multiplex signal train. Similar circuitry would be employed at the receiver to reverse the process, that is, convert the separated PCM channel signals to audio. To cooperate fully in eliminating the system within a system, simplified PCM coders and decoders have been developed and will be discussed hereinbelow under the heading of "Coder" and "Decoder," respectively.

As in all multiplex systems, some method of synchronizing and framing must be included in a PCM system. In other words, the frequencies at the receiver must be coincident with the frequencies at the transmitter and there must be phase coincidence between the signals generated at the receiver for demodulation and those signals generated at the transmitter. Peculiarities of PCM systems themselves tend to complicate most schemes for synchronizing and framing. For instance, if a double pulse marker system, of the type used in PTM, is used, the bandwidth required for PCM video is approximately doubled. Since bandwidth is often limited, any synchronizing and framing system that requires a large increase in transmission bandwidth is not always attractive. If a marker system requiring nonstandard signal, that is, double pulse, high-amplitude pulse, burst of radio frequency energy and so forth, is employed, additional equipment complexity appears in regenerative repeaters. Some special marker systems change the nature of the PCM signal from a simple on-off type to a multi-valued type. Such markers impose additional requirements on the radio equipment. For example, to accommodate a double-amplitude marker system, the modulation produced by all normal pulses must be halved to stay within the modulation capacity of the radio frequency channel. Doing this results in a noise threshold 6 db poorer.

If on the other hand the marker signal is restricted to some distinctive combination of standard PCM pulses, the choice is still limited by the random nature of pulse combination which can occur with a normal modulating signal. For example, a suggestion has been made to reserve one channel for synchronizing and framing and insert a solid block of six pulses as a marker. It happens that six consecutive pulses present code number 63 which can occur with a probability of 1/64 in any normal six digit code transmission. Furthermore, any "distinctive" combination of six pulses represents some other code number and is no better than six consecutive pulses. To overcome the difficulty of getting distinctive pulse combinations, a suggestion, sometimes advanced, is to prevent the modulator from coding the number corresponding to that combination. The fallacy here is that the pulse combination will nevertheless be generated. For example, assume that six consecutive pulses are used as a marker and that code number 63, corresponding to this combination, is never used. A block of six consecutive pulses can still be formed by the last five pulses of one code group and the first pulse of the next group, or the last four of one group and the first two of the next group, and in other obvious ways.

In addition PCM systems require timing accuracy equal to a fraction of one digit pulse, rather than to a fraction of one channel interval. Many simple synchronizing and framing systems heretofore employed cannot meet the tighter timing requirements of PCM.

Further, the framing circuits should, ideally, permit operation down to the lowest ratio of video signal to noise that provides a usable audio output. Since PCM signals are much more resistant to noise than PTM signals, it would be desirable to use a better framing system with PCM. Such an improvement has appeared in the past to require more complex equipment.

The PCM system of this invention provides a solution to the marker signal problem and at the same time incorporates synchronizing circuits having the required timing accuracy and operation to the lowest usable ratio of video signal to noise. The marker signal is provided by employing a pulse having a rate equal to one-half the frame rate which replaces one standard message pulse. This is highly successful because the continuous on-off alternation of pulses in successive frames cannot be sustained for any appreciable time by the normal PCM message pulses. This appears to be one of the few methods that is both reliable and fast acting. The system of this invention employs delay lines which make a code element-by-code element search of the input message until the marker pulse is located. This results in a relatively high signal relative to the signal of code elements other than the framing element. Details of this circuitry and the operation thereof will be described hereinbelow.

Another step may be taken to reduce the complexity of present day PCM systems. In conventional time division multiplex systems, the time interval between sampling pulses is divided into equal increments, one for each channel. For example, in an 8-channel system with an 8-kc. sampling rate, the sampling or frame period of 125 microseconds is divided into $$\frac{125}{8}=15.6 \text{ microsecond intervals}$$

During each 15.6 microsecond, a PTM, PAM, or other type of pulse is sent. It was natural that with the advent of PCM, the same method should be applied for multiplexing PCM. Thus, in a six code element 8-channel system, the six code elements representing one code number would be consecutively sent within the 15.6 microsecond channel interval. The code element time would be $$\frac{15.6}{6}=2.6 \text{ microseconds}$$

The result of this prior art time sequence is that the coder, whether it is coding a single channel or all eight simultaneously, must be capable of coding at the same rate, 2.6 microseconds per code element. Thus, in this prior art multiplexing system it is necessary that a channel coder code in 15.6 microseconds and then sit idle for 109.4 microseconds.

The system of digit interlace disclosed herein eliminates the idle time of the coder and permits the coder to code at a uniform rate of $$\frac{125}{6}=20.83 \text{ microseconds per code element}$$

Figure 3:
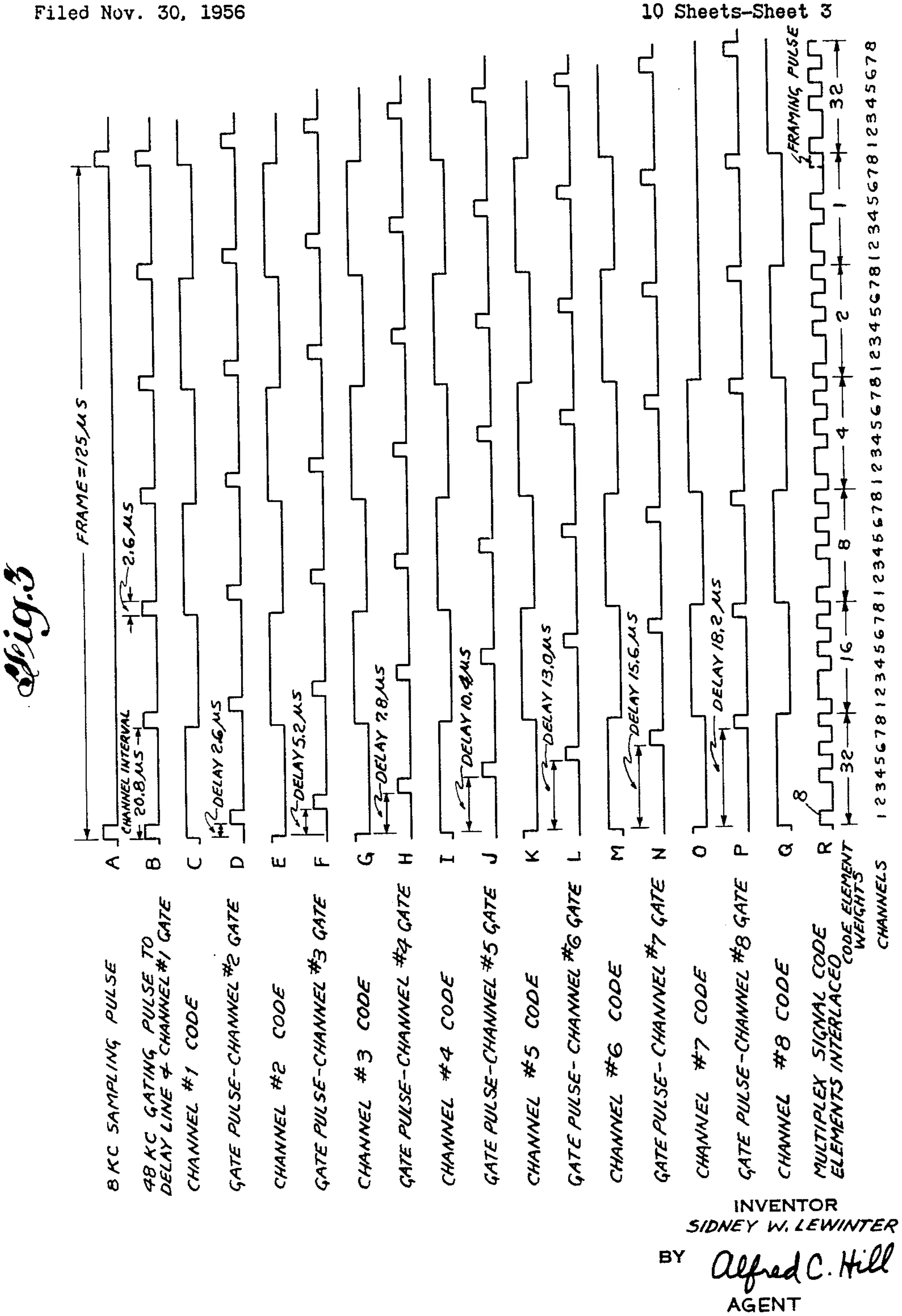
FIGS. 3 and 4 illustrate 2 sets of curves which are useful in understanding certain features of the system of this invention.

The sequence of this type of multiplex is illustrated in curve R of FIG. 3. In way of explanation, the highest weight pulse of each channel is sent in succession. Then the next to highest weight pulse of each channel is sent in succession. This is continued until the full frame is completed. It will be noted that an additional important advantage accrues from this method of multiplexing. The distributor used for commutating the various channels, generally a delay line, need only have a length of the order of 20.8 microseconds. Taps are brought out at eight, 2.6 microsecond intervals. In the prior art multiplex arrangements a 125 microsecond delay line was required with taps at 15.6 microsecond intervals.

Some of the features of the present PCM system have been briefly discussed hereinabove pointing out how these features may be employed to simplify PCM systems particularly those systems with a relatively small number of channels and only a few hops. The description will now be directed to a more detailed discussion of the system as a whole and the various features mentioned hereinabove.

Figure 2:
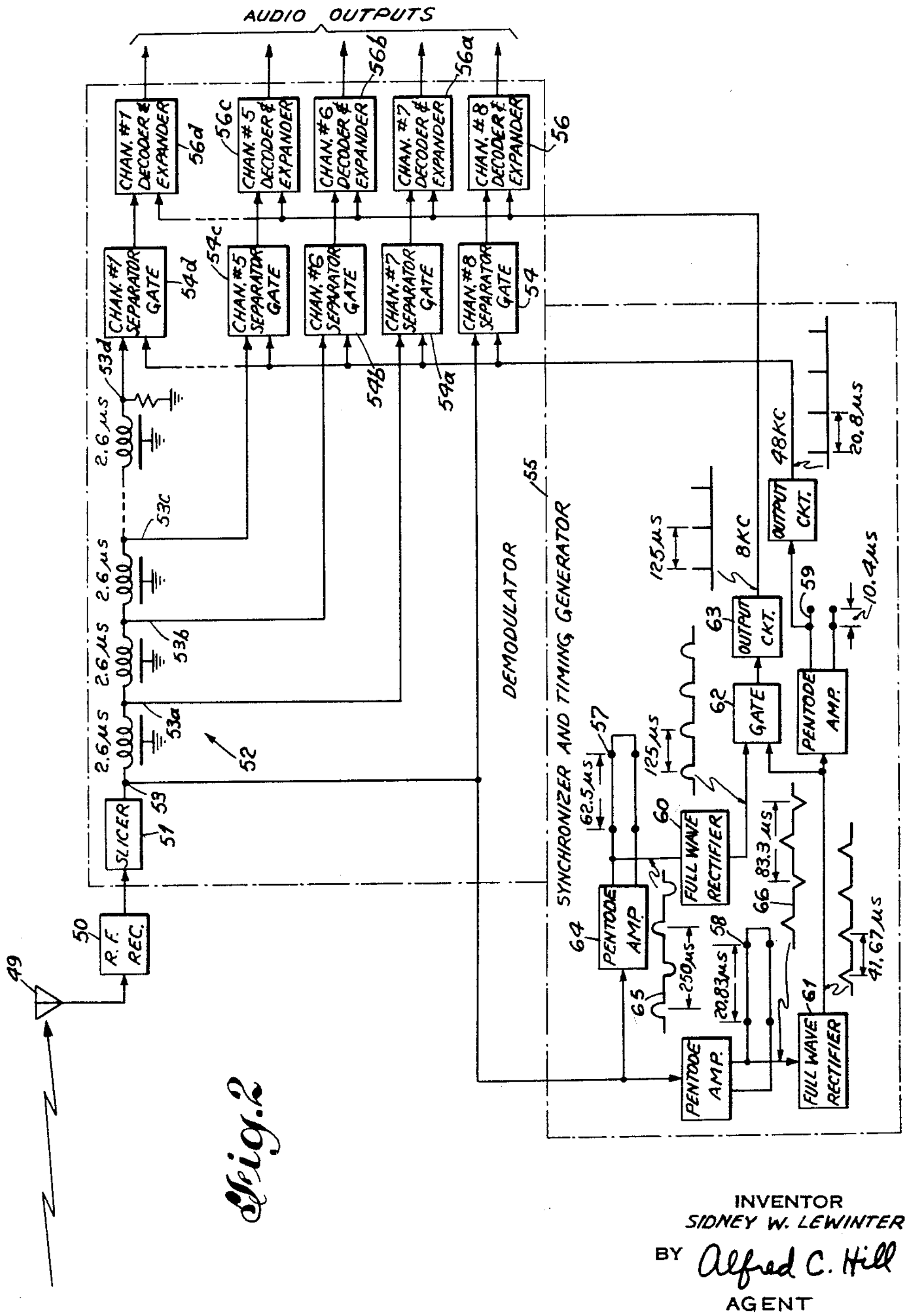
FIG. 2 illustrates in block diagram form the receiver side of a PCM system in accordance with this invention.

Referring to FIGS. 1 and 2, the simplified PCM system of this invention is disclosed in block diagram. FIG. 1 discloses the circuitry in block form of the modulator side of the PCM system. Audio signals are coupled to terminals 1 for application to their respective channel modulators 2 where the audio signal is compressed and coded directly into a PCM signal, for instance, a six code element binary PCM. The compressor and coder circuits will be described hereinafter under the appropriate headings. The coded outputs of modulators 2 are essentially in time coincidence occupying the entire frame period with each code element occupying a time interval of $$\frac{125}{6}=20.8 \text{ microseconds}$$

Each such interval is divided into eight parts, one for each channel, and each of the modulator outputs is sampled during its allotted sub-interval by the operation of gates 3 gated by properly phased frequency pulse. For purposes of explanation let us assume that the system has the specification as set down hereinabove. The frequency pulse to accomplish this gating is produced in timing generator 4 and has a repetition frequency of 48 kc. of width $$\frac{20.8}{8}=2.6 \text{ microseconds}$$

These pulses are applied over conductor 5 to tapped delay line 6 consisting of seven sections of 2.6 microseconds each. The gating pulse output of the successive taps along delay line 6 sequentially sample modulator 2 output by sequentially gating gates 3. The pulse width and phase or timing of these pulses produce at the output of modulators 2 the highest weight code element of all the channels in the first interval, 20.8 microseconds, the next highest weight code element of all the channels in the second interval and so on until all the weight code elements are sampled and the frame period is completed.

This sequence of gating operation is illustrated by the curves of FIG. 3. Let us consider in detail the interlacing of the highest weight pulse of all the channels. Curve A illustrates the frame rate pulse which causes the coder to sample the intelligence signals. Curve B illustrates the 48 kc. channel sampling pulse as applied over conductor 5 to the input of delay line 6 at tap 7. This curve also illustrates the sampling pulses coupled to gate 3. Curve C illustrates the condition of the highest weight code element of channel #1. Coincidence of the pulses of curves B and C produce at the output of gate 3 the pulse as indicated in curve R at 8. Curves D, F, H, J, L, N and P illustrate the time displaced outputs from the successive output taps along delay line 6. Coincidence of these sequentially produced gate pulses with the highest weight code element output of each channel modulator, as represented by curves F, G, I, K, M, O and Q, produce the highest weight code elements of each channel sequentially as illustrated in curve R. Following to the next sampling period of curve B and then down the set of curves the production of the next highest weight code elements may be followed in the same manner. Progressing to the next sampling period of curve B and again down the set of curves the next weight pulse of each channel is gated to provide the interlaced train of code element pulses as before. Continuing this process, it is possible to observe from the curves FIG. 3 the production of all the code elements of each channel as is needed to provide the interlaced code elements of each channel.

The outputs of the gates 3 are coupled to a common conductor 9 to obtain the eight channel PCM signal illustrated in curve R of FIG. 3. This code element interlaced multiplex pulse train is coupled over conductor 9 to modulator synchronizer 10 where the least weight pulse of a selected one of the plurality of channels is blanked out and a 4.0 kc., half frame rate pulse, is fitted in its place. The 4 kc. pulse is generated by counting the 8 kc. pulse output of timing generator 4 in a flip-flop 11 and gating the flip-flop output in gate 12 with the 8 kc. from timing generator 4. The common output of gates 3 is applied to blanking gate 13 which is controlled by the 8 kc. output of the timing generator 4 wherein the least weight pulse of channel eight is blanked out by the action thereof. This marker or framing pulse is illustrated in curve R, FIG. 3, by the dotted pulse. The outputs of gate 13 and gate 12 are combined on conductor 14. By the circuitry of synchronizer 10, perfect coincidence between the blanking 8 kc. signal and framing 4.0 kc. signal is assured.

The signal on conductor 14 may be adequate for transmission over the radio equipment. However, it is preferred that the timing of the signal be restandardized since the timing of the signal at this point is determined by the accuracy of certain delay lines. This restandardization is necessary to assure proper operation of the demodulator equipment. To accomplish this, the signal on conductor 14 is coupled to regenerative shaper 15. The signal is coupled to phase splitter 16. The output of phase splitter 16 which is in phase with the PCM signal applied to the input thereof is coupled to gate 17 and the output of phase splitter 16 which is 180 degrees out of phase with the input PCM signal is coupled to gate 18. This phase splitting is illustrated, for instance, by curves 19 and 20, respectively. The phase relationship is obvious when compared to the input curve 21 where pulse 22 represents a PCM pulse and the blank 23 represents no PCM pulse. This representation is of course not the whole PCM pulse train, it is illustrative of the two conditions that may be present in a PCM pulse train and is useful in explaining the operation of shaper 15.

Gates 17 and 18 are sampled by 384 kc. pulses, the code element rate, which is coupled from timing generator 4 along conductor 24. Gate 17 will produce at its output a pulse 25 whenever the original PCM signal contains a pulse. This occurs due to coincidence between pulse 22 of curve 19 and a code element rate sampling pulse. Gate 18 will produce at its output a pulse 26 whenever the original PCM signal does not contain a pulse. In this case, it will be noted that when the original PCM signal is inverted the pulses become blanks and the blanks become pulses. Thus, the blank 23 of the input signal becomes a pulse 23′. Coincidence between this pulse 23′ and a pulse of the code element rate sampling pulse produces pulse 26. It will be noted that the pulses 25 and 26 are not in time coincidence. This is due to the fact that, in this case, gates 17 and 18 are gated by adjacent pulses of the code element sampling pulses. Thus, the produced outputs of gates 17 and 18 are time spaced, the spacing depending upon the code combination of the original PCM signal. Pulses 25 and 26 are inverted by inverters 27 and 28, respectively, producing pulses 29 and 30, respectively. The explanation here is somewhat confusing inasmuch as inverters 27, 28 are needed if gates 17, 18 are of such a type that the outputs are positive pulses. If the gates are dual control grid types, then the plate outputs are negative and the inverters are needed. The circuit 31, 32, 33 must receive narrow positive pulses on both its input terminals. Pulse 29 renders electron discharge device 31 non-conductive due to the negative characteristic or "off" pulse representation thereof and pulse 30, due to its more positive characteristic or "on" pulse representation, renders diode 32 conductive. Thus, condenser 33 is charged up to a predetermined value. When the voltage characteristic of pulses 29 and 30 reverse, diode 32 becomes non-conductive and device 31 becomes conductive allowing condenser 33 to discharge through device 31. Thus, the accurately timed outputs of gates 17 and 18 charge and discharge, respectively, storage condenser 33 which has a potential difference at any time that will represent the amplitude of the PCM pulses. The condenser 33 voltage is then coupled to a slicer 34 wherein the signal on the condenser 33 is standardized as to amplitude. The output of slicer 34 is then coupled through a band limiting filter 35 of approximately gaussian characteristic. The output of filter 35 is coupled to transmitter 36 and hence from antenna 37 for propagation over a propagating medium.

The modulator timing generator 4 includes, for the system having the example specification herein employed, a 384 kc. master crystal oscillator 38 whose output is operated on by squarer 39 to provide square waves at a 384 kc. repetition rate. This square wave output is then applied to an output circuit 40 for distribution to those circuits to be timed at this frequency rate, for instance, shaper 15. The output of squarer 39 is coupled to a divider 41 to produce from the 384 kc. source a 48 kc. timing wave. The 48 kc. timing wave is gated in gate 42 with the 384 kc. square wave to standardize the 48 kc. pulse width at 1.3 microseconds and to assure time coincidence of these two signals. The 48 kc. pulses are distributed from output circuit 43 to delay line 6. The output of divider 41 is also coupled to divider 44 to produce therefrom an 8 kc. timing wave. The 8 kc. square wave is standardized against the 48 kc. timing wave output of circuit 43 in gate 45 in a manner similar to that accomplished in gate 2. The 8 kc. standardized output of gate 45 is distributed from output circuit 46 to synchronizer 10 and modulators 2. The signal designated as (48–8) consists of a 48 kc. pulse train with every sixth pulse removed. This timing wave is generated in blanking gate 47 by blanking the 48 kc. pulse train of circuit 43 with the 8 kc. pulse train of circuit 46. The thusly produced timing wave may be coupled through switch 48*a* from output circuit 48 in common to all modulators 2 to cooperate with the 8 kc. timing wave in the direct coding operation of the audio signals applied thereto when certain coders are employed, for instance, the coder of FIG. 14.

Referring to FIG. 2, there is illustrated in block diagram form the demodulator end of the PCM system of this invention. The PCM signal transmitted from antenna 39 of FIG. 1 is received on antenna 49 and is coupled to receiver 50 wherein the PCM signal is removed from the radio frequency carrier. The PCM signal is then coupled to slicer 51 to remove amplitude fluctuations from this signal. Thus, the amplitude of the PCM signal is regenerated by removing possible noise that may have been picked up during transmission. The output of slicer 51 is then coupled to delay line 52 having a length of 20.8 microseconds. Disposed along line 52 are output taps 53 at intervals of 2.6 microseconds. Output taps 53 are coupled to appropriate channel-separator gates 54. Delay tap 53, no delay, is coupled to gate 54 of channel #8, delay tap 53*a*, 2.6 microsecond delay, is coupled to gate 54*a* of channel #7, and so on along the delay line with the pulse train having 20.8 microsecond delay being coupled to gate 54*d* of channel #1. The resulting delay of the pulse train being applied to each of the gates 54 is illustrated graphically in FIG. 4, curves A to H.

Figure 4:
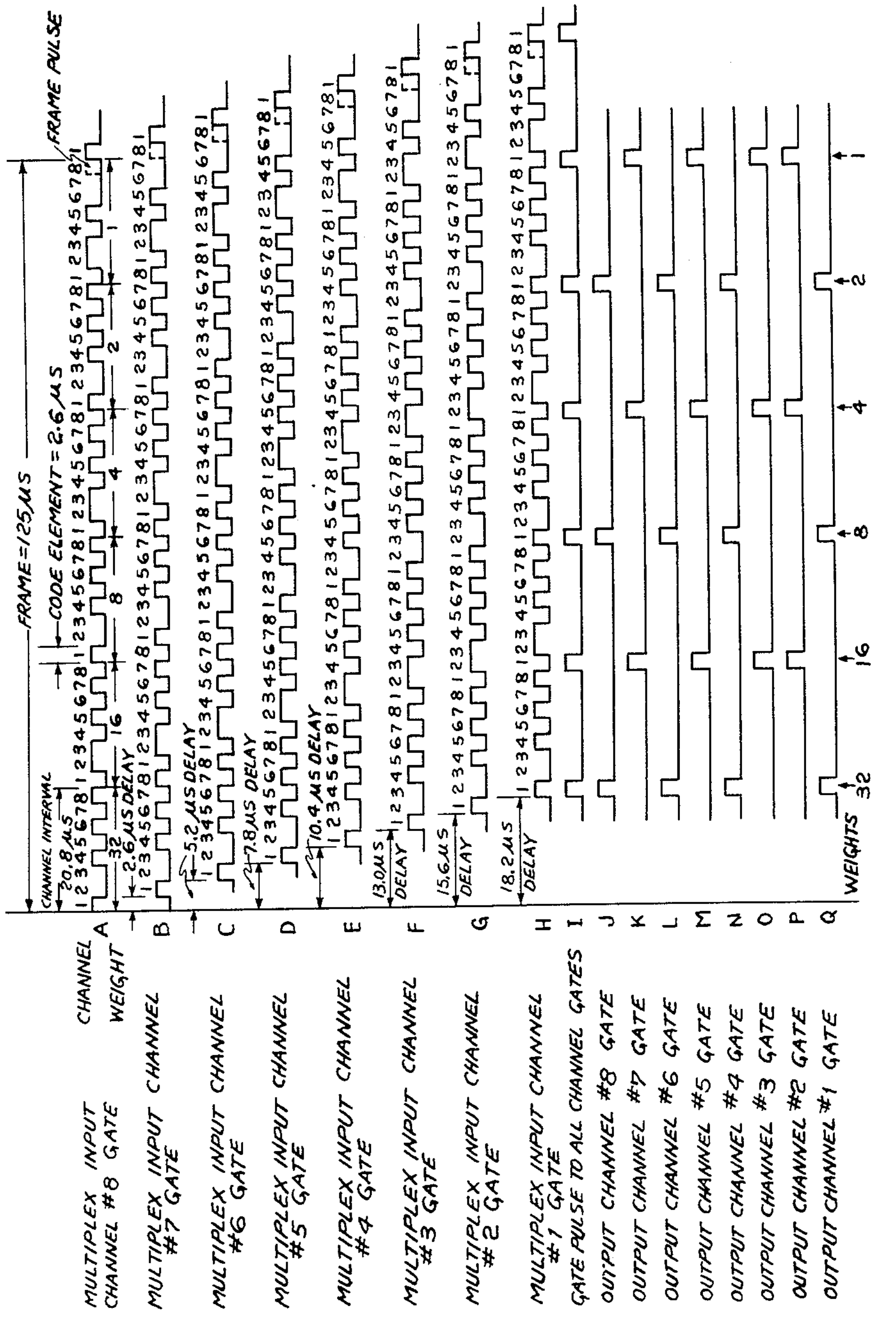

All of gates 54 receive standard 48-kc. sampling pulses derived from the demodulator synchronizer and timing generator 55. This timing pulse wave is illustrated in FIG. 4, curve I. The 48 kc. sampling pulses are coincident with PCM pulses of the individual channels as these are timed by delay line 52 at the inputs to their respective separator gates 54. In other words, the delay line 52 delays the input PCM a sufficient amount to make the code elements of all the channels time coincident so that the properly timed 48 kc. sampling pulse may simultaneously gate gates 54 to separate the code elements of each channel from the interlaced multiplex pulse train. It will be noted that the highest weight code element of the respective channel gate inputs are in time coincidence with the first pulse of curve I. The gating operation which follows separates the individual code elements of the proper channel from the code elements of the other channels in the interlaced multiplex signal. Thus, the code elements of an individual channel is ready to be decoded in the appropriate one of demodulators 56 to recover channel intelligence. This is graphically illustrated in curves J to Q, FIG. 4. Demodulators 56, include a PCM decoder to recover audio signals and also an instantaneous expander complementary to the compressor at the modulator end of the system. The decoder will be described in detail under the heading "Decoder" and the expander will be described in detail under the heading "Compander."

A secondary purpose of separator gates 54 is to improve the signal-to-noise ratio by completing the regeneration of the PCM pulses started in slicer 51. It is commonly known that a PCM signal is resistant to noise and interference because it is only necessary to correctly detect the presence or absence of pulses to gain complete freedom from extraneous disturbances. A regenerator is conventionally employed to replace the noisy pulses with new ones standardized in amplitude and timing. The conventional regenerator slices the signal at its midpoint in amplitude and samples each pulse at its midpoint in time. The pulses are then reconstructed from the information so obtained. To avoid duplication of function in the system of this invention, a complete regenerator is not provided. In the system of this invention the input signal is sliced in slicer 51 and transmitted through demultiplexer delay line 52. Separator gates 54 provide all the advantages of time selection by being sampled by the narrow sampling pulses from generator 55.

The output of slicer 51 is also coupled to demodulator synchronizer and timing generator 55. This unit provides timing signals at 8 kc., frame rate, and 48 kc., channel interval rate, correctly phased with respect to the PCM marker pulse. These timing signals are generated by means of three reflective delay lines 57, 58 and 59 and shaping circuits associated therewith. A detailed description of the operating principles are given below, but, briefly, the delay line employed herein may be considered to act as a resonant element. Instead of being resonant to a particular frequency band as in a conventional filter, the delay line resonates to a particular combination of time-varying signals. That is, when it is excited by pulses, the output is negligible, except for the case when the pulses recur at certain specific rates. At these rates, the delay line will generate a characteristic pulse sequence in much the same way as a parallel LC circuit will resonate at its natural frequency. Delay lines 57, 58 and 59 will build up on the 4 kc. marker pulse and to no other pulse in the PCM signal. Delay line 57 generates a 4 kc. pulse of slow rise time. This is converted to an 8 kc. pulse by full wave rectifier 60. Delay line 58 generates a 12 kc. pulse of better rise time. This is converted to a 24 kc. pulse by full wave rectifier 61. The 8 kc. output of rectifier 60 is gated against the 24 kc. pulse output of rectifier 61 in gate 62 to obtain a more accurately timed 8 kc. pulse output for distribution through output circuit 63. Delay line 59 converts the 24 kc. pulse output of rectifier 61 to a 48 kc. pulse. Since only the marker pulse builds up the delay line, the output signals are automatically phase referenced to the marker pulses. The output frequency of the delay line is of course determined by the length of the delay line and the type of reflective termination at the end of the delay line.

Hereinabove, the framing or synchronization of the demodulator has been considered briefly. Let us now turn to a more detailed discussion of how the framing is accomplished in the system of this invention. First, consider the type of signal being received by the demodulator end of the system. The PCM signal is formed by a succession of frames. One frame of the PCM signal is defined as a group of consecutive code elements containing one complete code number for every channel. The frame has the duration of the sampling period, 125 microsecond, in the example employed herein. It begins with the heaviest weight code element of the first channel and ends with the least weight code element of the last channel. The number of code elements per frame equals the number of channels times the number of code elements per code number. For the eight-channel six-code element system under consideration here, there are 48 code elements per frame which establishes the code element width as $$\frac{125}{48}=2.6 \text{ microseconds}$$

The structure of the frame is shown in curve R, FIG. 3, and again in curve A, FIG. 4.

The code elements of the PCM signal of the system of this invention are adjacent one another with no gaps between them. This is a desirable condition for bandwidth conversation and least critical timing. In the absence of modulation, each coder of modulators 2 generates either level 31 or 32 of the code. If one examines a given code element of an unmodulated channel as it appears on successive frames, one will find that it always contains a pulse or that it never contains a pulse. If the channel is modulated, the pulse blinks on and off at a semi-random rate with equal probabilities for either state. The framing or synchronizing pulse is distinguished by the fact that it is present on alternate frames and absent on all other frames. There is no normal modulating signal which will cause any PCM pulse to alternate in this manner for any sustained time interval. In curve R, FIG. 3, and curve A, FIG. 4, the framing pulse is shown in the least weight code element of the last channel. There is no reason why any other code element cannot be used for framing. The normal pulse generated in coding is removed and the framing pulse is substituted. The advantage of using a least weight pulse is that the channel is still usable with performance equivalent to a five code element code system.

The methods of detecting a framing pulse of this type are all based on its regularly alternating pattern of appearance. In addition, provision for locking on the framing pulse when the pattern is not quite regular must also be made. This is the condition prevailing when there is a mixture of signal and noise. The method employed in the simplified system of this invention is based on the use of suitable delay lines. This method is most direct and is capable of performance equivalent to more complex systems. However, for performance under very high noise levels, it imposes severe conditions on the delay line, which may render this arrangement impractical. It should be kept in mind, however, that the application of this system is not primarily to combat high noise levels, but rather to permit ciphering. Thus, for short- and medium-haul work with normal noise levels, the delay line method will be entirely adequate.

Consider a delay line with one-way delay equal to T shorted on the receiving end, as illustrated by delay line 57, FIG. 2, and driven by a constant-current source, as illustrated in FIG. 2 by pentode amplifier 64. If a short rectangular current pulse of magnitude $i$ is impressed at the sending end, a voltage pulse of amplitude $iR_0$, where $R_0$ is the characteristic impedance of delay line, starts traveling down the line. It is reflected with a polarity reversal at the shorted end and returns to the source where it is reflected in phase. The voltage returned to the source and reflected at the source add in phase to produce a voltage pulse of amplitude $-2iR_0$ at a time 2T after the original pulse. If no further pulses are applied to the line by the current source, the original pulse continues to bounce back and forth and appears at the source at periodic intervals 2T at a magnitude of $2iR_0$ minus the delay line attenuation and alternating in sign at each appearance. This type of response is illustartde in curves 65 and 66 of FIG. 2.

It is clear that if, coincident with the appearance of some of the reflections at the source, additional current pulses of identical amplitude and wave shape are inserted by the source, then each such applied pulse will generate a component of the total delay-line sending-end voltage similar to what is shown in curves 65 and 66 of FIG. 2. The resultant voltage can be found by superposition. The voltage measured at the input of the delay line will continue to build up, limited in a practical delay line by the attenuation if the successive transients reinforce each other. If they cancel each other, negligible input voltage will be measured. If the pulses injected by the source are of random polarity, we can sort the pulses into two categories. Those that tend to build up a transient response of one phase relative to curves 65 and 66 and those that tend to build-up a transient of the opposite phase. If one considers a long series of such random pulses, they will divide into almost equal percentages of each category. Therefore, the voltage built up for such a random pulse sequence relative to the voltage built up by a pulse sequence where all transients reinforce each other becomes vanishingly small as the number of pulses under consideration is progressively increased.

The application of a delay line for the detection of the framing pulse in the presence of all the normal pulses in the PCM frame is now evident. Turning to FIG. 2, the round-trip delay of shorted delay line 57 is made exactly equal to the period of one frame. The voltage built up by any code element in the frame can be studied separately from the response produced by any other code element by applying superposition. If the code element being studied contains the framing pulse, then coincident with the framing pulse a transient of high-amplitude pulses of alternating polarity is developed, curve 65. If one studied a code element from an unmodulated channel, such a code element will contain a pulse having the same polarity on all frames. No net output will be developed in that code element. Any code element from a modulated channel can be considered as containing an almost random pulse sequence. A vanishing small signal will be developed in that code element, relative to the signal produced in the framing code element.

In a similar manner, delay line 58 will build up on the framing signal to produce after rectification a 24 kc. timing pulse. The difference in frequency is accounted for in the different round-trip delay of delay line 58.

By using an open circuited delay line, such as delay line 59, having a round-trip delay equal to one half that of delay line 58, it is possible to produce from the 24 kc. timing signal a 48 kc. timing signal. The difference in the wave form at the sending end of delay line 59 and that at the sending end of delay lines 57 and 58 is accounted for in the fact that an open circuited delay line reflects without polarity reversal. However, the same build up on the regularly recurring framing pulse takes place in this delay line as it did in the others.

*Coder*

To carry forward the simplification of PCM systems as outlined hereinabove, let us consider the present state of the coder art and then exploit simpler methods and means of coding an audio signal directly into a binary type of code signal.

Figure 5:
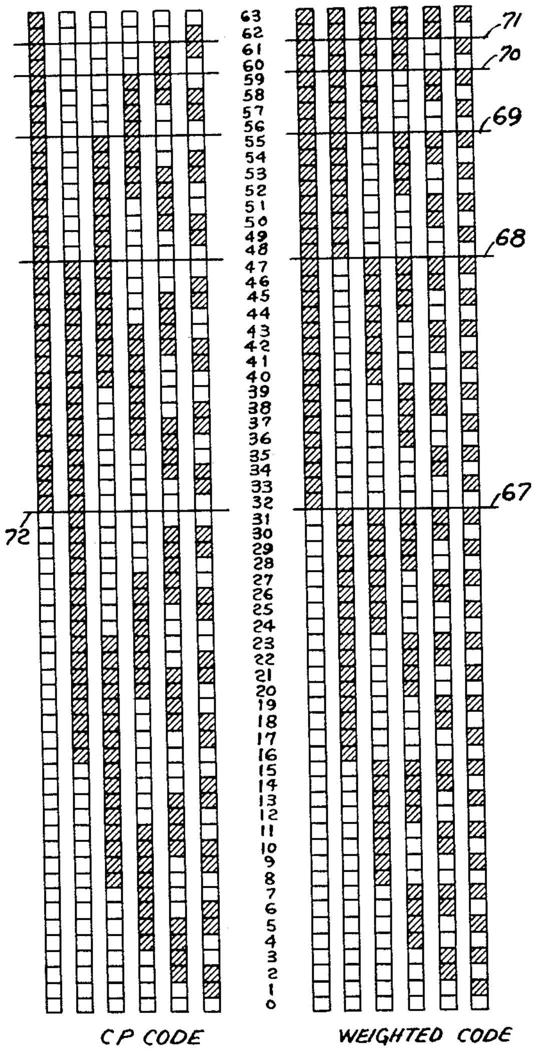
FIG. 5 illustrates the geometry of code rasters for weighted binary code and CP code which are useful in understanding the coding operation employed in the system of this invention.
Figure 19:
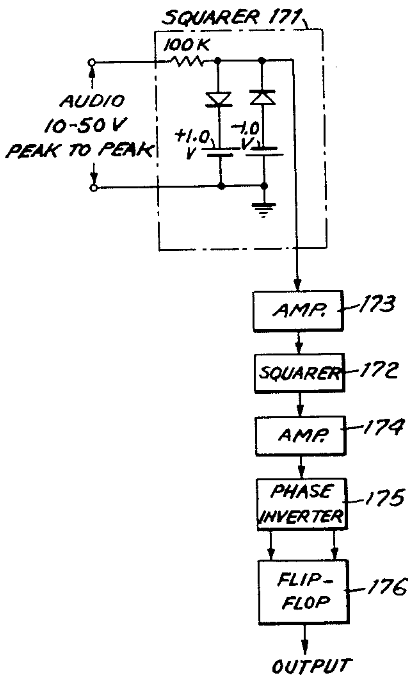
FIG. 19 illustrates schematically a slicer that will satisfy the requirements of the PCM coders of this invention.

The discussion following is concerned with improved methods of binary coding in the standard weighted notation, the cyclic progression (CP) or reflected binary code, and certain other binary notations. FIG. 5 is a diagram of both the standard weighted binary notation and the CP notations for a six-code system. In the standard weighted binary code, a number N is expressed as:

$$(1) \qquad N=a_n2^n+a_{n-1}2^{n-1}+ \ . \ . \ . \ +a_12^1+a_02^0$$

The subscripts $a_n$, $a_{n-1}$, etc. can have values of either zero or one.

The CP code is one of a set of a large number of possible binary codes which has certain very desirable properties. Chief among these are (1) relative ease of generation with certain coding schemes and (2) simple apparatus can convert this code to weighted binary code.

There are many schemes known for generating weighted binary code, but so far as is known, these can all be classified into three general methods.

The first method is counting. The quantity to be coded is converted to a number. For example, a sample value is converted to a proportional pulse duration which is then gated with a fixed frequency oscillator. The gate output will be a number of oscillations proportional to the sample value. The number is then applied to a cascade of scale of two counters which have been initially prepared in a reference state. The state of each counter at the end of the counting period gives digit by digit the weighted binary code.

The second method is weighing. These schemes require a comparison of the sample with a reference quantity and then a modification of the sample and/or reference in one of two possible ways, the choice being determined by the algebraic sign of the comparator output. This process is repeated until the sample value is known to a sufficient degree of accuracy.

The third method is the raster method. This is the most general method of all and can be used to generate either weighted or cyclic code as well as many other codes. In this method, each code element is generated independently of all the other code elements in accordance with a law that is appropriate for that code element. In one method, a plate is punched with the appropriate code pattern. For example, either of the patterns of FIG. 5 may be punched into a coding plate with a slot corresponding to every cross-hatched area on the diagram. Behind each of the six code element rows, a collector strip may be placed, one strip for each code element. An electron sheet whose plane is perpendicular to the six rows is formed. This sheet is deflected in the direction normal to itself by a distance proportional to the signal amplitude. The presence of collector current in any given situation indicates that the digit pulse corresponding to that collector should be sent.

Instead of using spatial coordinates one may use time, frequency, amplitude or other coordinates. For example, the sequence for any given code element in either code may be generated as a function of time as square waves by means of delay lines or other techniques. Whether or not the particular code element pulse should be sent is determined by the indication of an "and" gate which receives the square wave and a position modulated signal pulse. A second example, uses a chain of selective circuits of appropriate bandwidths and frequencies to form the pattern for a given code element with frequency as the independent variable. A frequency modulated signal wave is applied to the filter chain. The build-up of voltage across any one of an appropriate group of filters determines whether or not a particular code element pulse should be sent. The diode matrix method of constructing the code raster with amplitude as the independent variable is another example of the raster technique.

Without elaborating, it can be stated that all of the presently known coding schemes have very restrictive limits on their range of practical usefulness. These limitations arise from a large number of seemingly diverse and unrelated causes, but somehow, one or more of them conspire to plague every coding scheme.

The coding scheme of this invention which cooperates in the simplification of PCM systems will be described immediately below. While this method overcomes some of the difficulties of the preceding methods, this method also has its own set of limitations which may restrict its use. Nevertheless, there will be certain situations which will call for this method in preference to conventional schemes.

In classification, one may state that this method is an outgrowth of the raster technique. Note that the raster technique is so general that every possible $n$ code element binary code may be generated by it. The number of such codes is the number of permutations of $2^n$ things taken $2^n$ at time, namely $(2^n)!$.

It may be observed that most of these codes are useless from the practical standpoint. This is a result of the impossibility of decoding most of them with reasonably simple apparatus. A general decoder that would operate on any given $n$ code element binary code would include $2^n$ recognition elements. Each element must give a positive response to one and only one of the $2^n$ code numbers, with each recognition element assigned to a different number of the set. Each recognition element would be connected to a circuit that can key in a value, such as amplitude, time or other, proportional to the number assigned to its recognition element in the code sequence. The outputs of all the keying circuits would be linearly combined by an appropriate means to obtain a decoded signal. Obviously, the decoder just described is impractical. Therefore, most binary codes are useless unless one considers them only from the standpoint of secrecy and ciphering value.

In order to be useful, a code must be constructed in accordance with some plan or system. This should lead to a periodical form for the on-off representation of a given code element when that code element representation is plotted against code number. Also, the structure of the code should be iterative from code element to code element. That is, by examining the structure of such an $n$ code element code, it should be possible to construct a code of $n+1$ code elements of the same type. Both weighted and CP binary code may readily be seen to be in this class of useful codes. In weighted binary codes, there is in addition the useful property that the digits can be given a weighted interpretation on a scale of powers of 2. Therefore, the complete description of the code raster along both of its coordinates, code number and code element order, can be specified very successfully by Equation 1.

Equation 1 is a basis for a host of coding schemes in accordance with the first and second general methods previously outlined. It is also the basis of all commonly used decoders.

In the CP code it is also possible to give a description of the code in a manner analogous to Equation 1 but such a description is more complicated and is of consequently lesser practical value. However, the symmetry of the form of CP code is evident from inspection of FIG. 5. In essence, the new coding principle of this invention proposes to adapt the raster method so that it can be simplified by making use of the symmetry contained in the code raster. Obviously, only the "useful" codes in the sense previously defined are amenable to this principle.

To apply this principle a code is most profitably not considered as resulting from defining Equation 1, but rather as an entity resulting from the specification or geometry of its raster. Note in FIG. 5 that in both codes there is a regularly recurring pattern from code element to code element in the code construction. Once the particular pattern for a given code is recognized, then one can readily construct the raster of that code for any number of code elements. Note also that it is not necessary to associate any weight or numerical value with the various code elements in order to construct the pattern. The construction is made entirely on the basis of a geometric specification for that code.

For example, in weighted PCM, it is noted that the greatest weight pulse is sent if the number is greater than half the range of the code sequence. In other words, if the number being coded lies in the upper half of the code raster a pulse is sent. If we bisect the range at its mid-point, between levels 31 and 32, as indicated by line 67 and translate the lower range so that it is superimposed on the upper range, then it may be seen that the next highest weight pulse is sent if the number being coded is on the upper half of the resulting pattern or in other words, above line 68. If this resulting pattern is then bisected on line 68 and the lower range is translated to be superimposed on the upper range then it may be seen that the next highest weight pulse is sent if the number being coded is on the upper half of this resulting pattern or in other words, above line 69. Additional bisections and translations along lines 70 and 71 will yield more code elements. It follows that similar operations on a signal wave will permit it to be coded into weighted binary. Note that this method is fundamentally different from the weighing method, the second method discussed hereinabove, where the sequence of events continuously depends upon the results of the preceding weighing. Here the bisection and translation proceeds in the same manner for any code number, and the code elements can be generated simultaneously.

Because of the relationship of the method just proposed to the raster method, a little thought will show that both are subject to similar sort of gross errors in coding if one codes into weighted binary directly. To reduce this gross error, it is preferable to code into CP first and convert later if weighted binary is desired. The reason for this is that only one pulse will be in doubt and that pulse must be the one that changes from a unit change in level. Contrast this with weighted binary where several pulses may be in doubt leading, therefore, to a large number of possible interpretations. It should be remembered, however, that the general principle applies to binary and all other useful codes. The apparatus about to be described will be for CP coding apparatus as well as weighted binary coding apparatus, each of the apparatus being different for each of the codes since these codes have different types of symmetry.

As a simple example of the symmetry technique, consider a case where one desires to modify an $n-1$ code element CP coder to generate a code of $n$ digits. Assume that there is a 5-digit CP coder and it is to be adapted to send a 6-digit CP code.

Referring to FIG. 5, it will be noted that if a 6-code element coder is adjusted to send level 31 or 32 in the absence of modulation, the polarity of the signal will determine whether or not the first pulse is sent. Note the pattern of the highest weight code element about line 72 of the CP code. Thus, referring to FIG. 6, there is employed a slicer 73 which functions to square up the modulation signal 74 substantially as is depicted by curve 75. The resulting square wave signal is applied to coincident gate 76. Also applied to gate 76 at terminal 77 is the first code element gate pulse such as would be applied from a distributor, delay line 6, FIG. 1. If at the time of sampling gate 76 the modulation signal is positive, a pulse will be sent from gate 76. This pulse if sent is coupled to adder 77. The problem remaining in this circuit is to make the coder 78 properly code the last five digits or code elements of a six-digit code. Referring to the CP code pattern of FIG. 5, it will be noted that all digits except the one already generated have even symmetry about line 72, the center of modulation. That is, the choice of sending any of the other digits or code elements depends upon the signal magnitude but not upon its algebraic sign. Accordingly, input signal 74 is coupled through full wave rectifier 79. The cusps 80 at the output of rectifier 79 will correspond to the region around 31—32 of the six-digit code. The peaks of the rectifier output, if the signal is large enough to fully modulate the six digits, correspond to levels 0 and 63. Since the cusps of the rectified output exist for all signal amplitudes, they are a dependable reference point for the rectifier output signal. The signal is arranged to have a polarity so that the cusps 80 are at its positive extreme. This resultant signal will then be applied to clamp 81 wherein the cusps 80 are clamped to a D.C. potential corresponding to level 31 on the number scale of the five-digit coder 78. This will require a clamping potential of 16 units. The coder 78 will generate the remaining five digits so that they correspond to the last five digits of the six-digit code for the original signal input. The output of coder 78 is coupled to adder 77 for combining with the resultant output of gate 76 thereby establishing a six-digit CP code output.

It should be apparent from the foregoing that if it is possible to modify an $n-1$ digit coder to make it code $n$ digits, it is possible to build a complete $n$ digit coder using the same principle applied $n-1$ times, provided that one can make a coder for a one-digit CP code. The latter, of course, would simply be a polarity indicator.

Figures 6, 7:
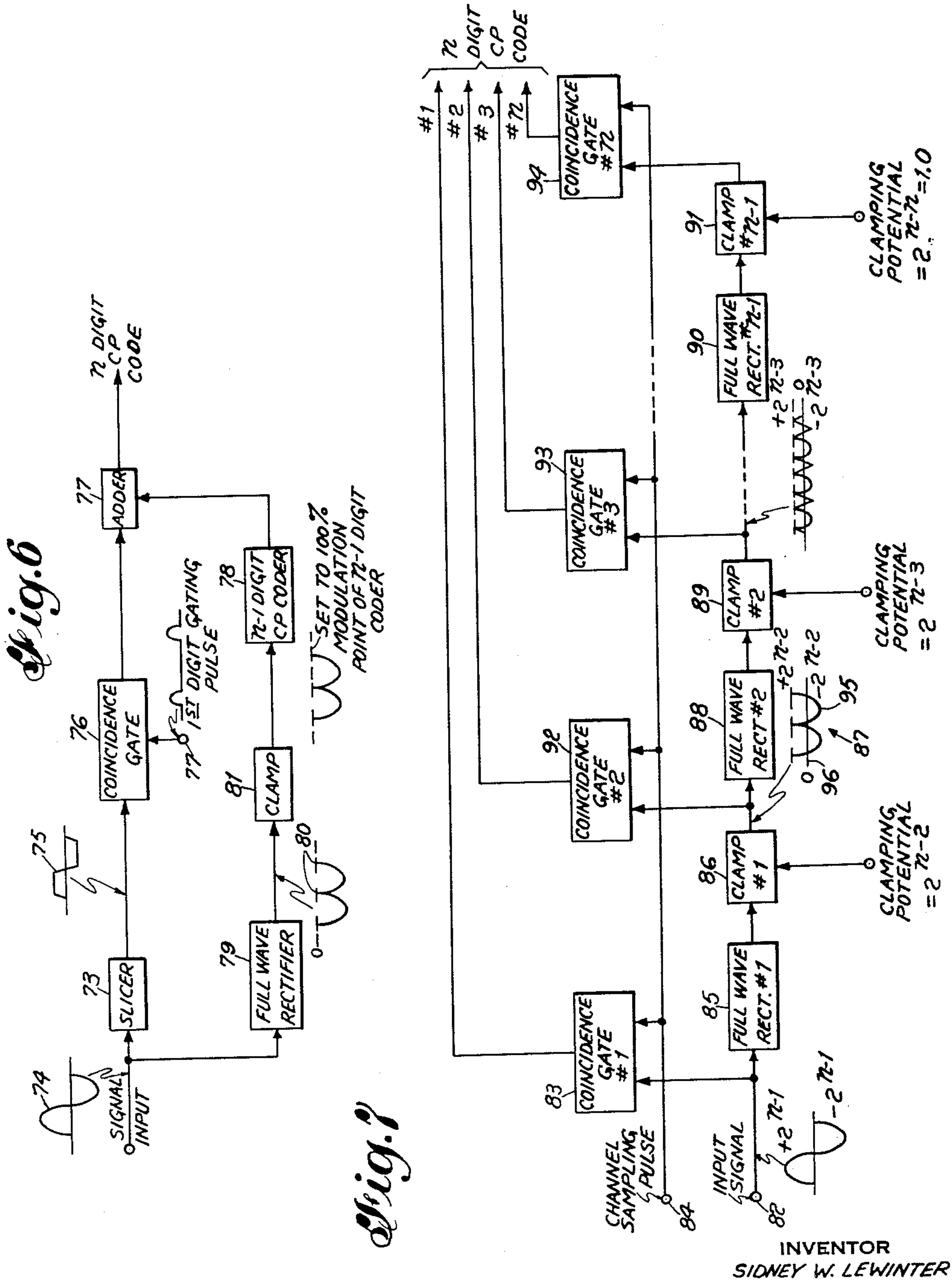
FIGS. 6, 7, 8 and 10 illustrate in schematic form several embodiments of CP coders adapted to be employed in the system of this invention.

Referring to FIG. 7, there is disclosed therein a coder for coding $n$ digits. The signal input is applied to terminal 82 and coupled to coincident gate 83 which in response to the channel sampling pulse applied at terminal 84 will gate the input signal if it has a positive polarity. Thus, the first digit as in the circuit of FIG. 6 is obtained by determining the signal polarity. The $n-1$ remaining digits are obtained by taking the negative full wave rectified representation of the signal, translating the cusps to a positive potential of $2^{n-2}$ and applying the clamp signal to a coder for $n-1$ digits. Thus, the signal input at terminal 82 is also coupled to full wave rectifier 85 wherein it is rectified for application to clamp 86 whose clamping potential is $2^{n-2}$ to translate the cusps of the rectified signal to a positive potential of $2^{n-2}$. This rectification and clamping is illustrated in curve 87. The output of clamp 86 is next coupled to full wave rectifier 88 where the signal applied thereto from clamp 86 is rectified about its point of zero, not average, potential, the polarity of the rectifier 88 being arranged to give a negative output. The output of rectifier 88 is applied to clamp circuit 89 having a clamping potential of $2^{n-3}$ applied thereto to clamp the cusps of the output of rectifier 89 to a potential of $2^{n-3}$. The output of clamp 89 is then applied to a coder of $n-2$ digits. It again includes a full wave rectifier and a clamp circuit clamped at a potential equal to $2^{n-4}$. This process and these circuits are iterative $n-1$ times to obtain a coder for $n$ digits. The final step would consist of taking the negative output of the $(n-1)^{th}$ full wave rectifier and translating it positive by a clamping potential of $2^{n-n}$ or one level as indicated in the circuit of FIG. 6 by full wave rectifier 90 and clamp circuit 91.

It will be recognized that the same channel sampling pulse is applied substantially simultaneously to all the coincidence gates and therefore in effect samples the output of each of the clamps simultaneously. This means that the code signal produced represents one point in time on the input signal despite its transformation in the full wave rectifier and clamps. Any slight phase delay introduced by the full wave rectifier and clamps into the signal and its transformation may be compensated for, if necessary, by correspondingly delaying the application of the sampling pulse as applied to successive coincidence gates.

An example of the generation of a code number below the center line of the raster and a code number above the center line of the raster will now be presented to illustrate the operation of the CP coders such as illustrated in FIG. 7.

The generation of code number 11 is demonstrated below. Consider the center line of the raster as the zero voltage point of the applied signal and as 31.5 on the number scale.

Therefore, the input signal has a voltage proportional to $-(31.5-11)=-20.5$. The rectifiers invert positive signals only. The sequence follows:

| Gate or Rectifier No. | Input to Gate | Output of Rectifier | Gate read-out: 1 if input to gate is +, 0 if input to gate is − |
|---|---|---|---|
| 1 | −20.5 | −20.5 | 0 |
| 2 | −20.5+16=4.5 | −4.5 | 0 |
| 3 | −4.5+8=+3.5 | −3.5 | 1 |
| 4 | −3.5+4=+0.5 | −0.5 | 1 |
| 5 | −0.5+2=+1.5 | −1.5 | 1 |
| 6 | −1.5+1=−0.5 | | 0 |

The generation of code number 43 is demonstrated below.

Input voltage is proportional to 43—31.5=11.5

| Gate or Rectifier No. | Input to Gate | Output of Rectifier | Gate read-out: 1 if input to gate is +, 0 if input to gate is − |
|---|---|---|---|
| 1 | +11.5 | −11.5 | 1 |
| 2 | −11.5+16=+4.5 | −4.5 | 1 |
| 3 | −4.5+8=+3.5 | −3.5 | 1 |
| 4 | −3.5+4=+0.5 | −0.5 | 1 |
| 5 | −0.5+2=+1.5 | −1.5 | 1 |
| 6 | −1.5+1=−0.5 | | 0 |

The coder thus will essentially consist of an array of full wave rectifiers, clamp circuits, and stable sources of reference of clamping potential. In addition, readout circuits must be added, such as coincidence gates 83, 92, 93 and 94. The positive signal coupled from the output of the clamp circuits to the respective gate circuits at the time of sampling indicates that the digit or code element corresponding to that clamp circuit should be sent. Note that the digits are obtained simultaneously, much the same as is accomplished in a line beam coding tube. It is to be understood that the use of the term "clamp" is intended to convey a function only. A practical embodiment of the coder just outlined will require D.C. coupling or other means in order to fix the potential throughout the coder to their necessary values.

The rate of the sampling pulse coupled to terminal 84 applied to the cincidence gates 83, 92, 93 and 94 is at the channel sampling rate, that is, 8 kc. for the example specifications of the system hereinabove described. For multiplex work, in the system described above, the 8 kc. is derived from the timing generator 4. Each coder can receive one channel. The six digits at the output can in turn be multiplexed in the manner set hereinabove with reference to FIG. 1.

Before describing other embodiments fashioned after the circuit set forth and described with reference to FIG. 7, one aspect of the CP symmetry coder will be mentioned. The full wave rectifier circuits, except for the first, are of a special sort. They must rectify the signal about the point of zero potential after the cusps resulting from the previous rectification are clamped to a specific constant potential. Examine the waveform 87, FIG. 3, at the output of clamp 86. This waveform is drawn for 100 percent modulation. For lesser degrees of modulation, the clamping circuit holds the positive peak at the constant potential of $+2^{n-2}$, but the valleys 95 rise. For less than 50 percent modulation, that is above the zero reference line indicated as 96, this waveform never crosses this zero axis, so that rectifier 88 under these conditions is not required to rectify but is required to invert without disturbing the absolute D.C. values. The process may better be described as reflection rather than rectification where the mirror plane is the zero potential line. It is evident that rectifier 88 must be D.C. coupled to clamp 86. Also, clamp 89 must be D.C. coupled to rectifier 88 if it is to perform its function of translating the cusps of the preceding rectification to the potential of $+2^{n-3}$. For the case where there is less than 50 percent modulation, rectifier 88 does not rectify and hence does not generate cusps. The cusps "tag" a reference point of the signal waveform in an unmistakeable way when cusps are generated. Without cusps, the signal waveform does not carry any identification that permits the succeeding clamp to function properly. Because of the foregoing, the coder must be D.C. coupled in its entirety. The circuits to be discussed hereinbelow are D.C. coupled.

Figure 8:
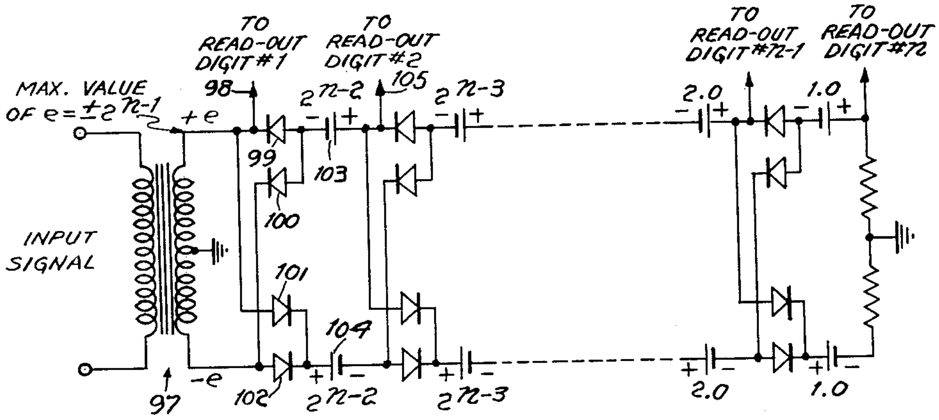

Referring to FIG. 8, there is disclosed therein a schematic of a symmetry coder having the general characteristics of FIG. 7 but using diodes only and of course being D.C. coupled. The input signal is coupled through transformer 97 for application to the successive full wave rectifiers for developing a signal indicating the characteristic of each code element of a code group. The signals coupled to the full wave rectifier are balanced signals 180 degrees out of phase by virtue of the transformer 97. As in the circuit of FIG. 7, the signal wave is coupled from lead 98 to the readout device for digit #1. If the signal is positive at the time of sampling the readout device, a pulse will be sent for digit #1. The signal is then coupled to a full wave rectifier including diodes 99, 100, 101, 102, arranged in a bridge configuration for full wave rectification of the signal applied thereto. The reference potential for clamping the output of the full wave rectifier configuration is established by batteries 103 and 104. The signal after this rectification and reference potential establishing function is coupled from terminal 105 to the readout circuit for digit #2. The circuit configuration just described is repeated that number of times necessary to completely code the input signal in accordance with the number of digits or code elements present in a code group.

It will be noted that in this arrangement, the number of diodes required increases linearly with the number of digits. On the other hand, the circuit of FIG. 8 requires floating batteries which seriously limits coding speed. For coding on a single channel basis, the speed limit is of course not of great importance. Also, batteries are today available which have very long lives with reasonably low drains.

Figure 9:
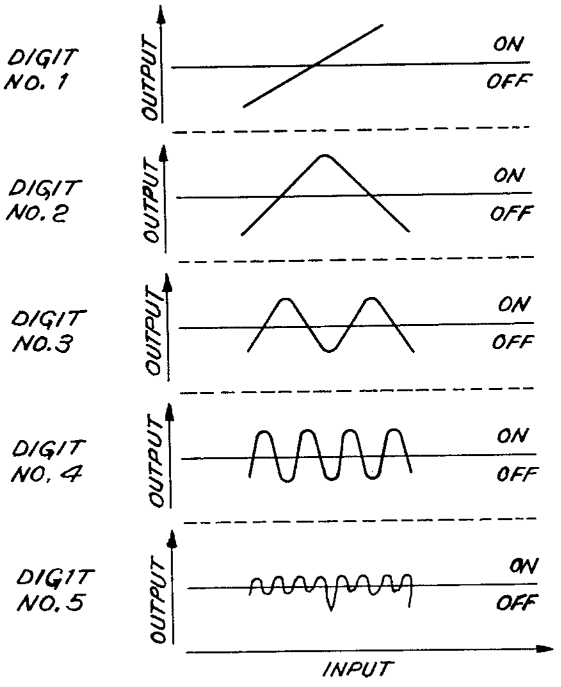
FIG. 9 illustrates a set of curves representing the operation of the circuit of FIG. 8.

A circuit of the type illustrated in FIG. 8 has been built for 5 digits. The diodes were type 1N38A. FIG. 9 illustrates the input-output characteristic at the five readout points. From this diagram if the input level is known it would be possible to predict the code configuration emanating when the individual digits are combined to form a single code group.

Figure 10:
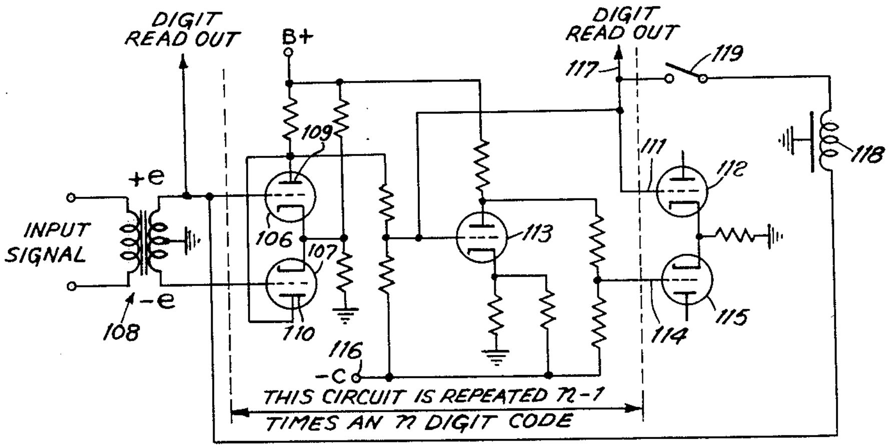

Referring to FIG. 10, a second circuit following the principles set forth in connection with the circuit of FIG. 7, is illustrated as employing D.C. coupled triodes for rectifiers and isolation. This circuit eliminates the floating batteries and makes up for a 6 db loss in level occurring at each of the rectifications in the diode type configuration. The rectifiers consist of two sharp cut-off triodes 106 and 107 with anodes connected in parallel and biased by the circuitry associated therewith to cut off. Triodes 106 and 107 are excited by balanced signals 180 degrees out of phase from transformer 108. The output from the anodes 109 and 110 are coupled to the terminal for readout and also to grid 111 of tube 112 of the succeeding circuit. The output is also coupled through triode 113 and hence to the grid 114 of triode 115 of the next stage. Triode 113 provides isolation and also the necessary 180 degree phase shift to assure that triodes 112 and 115 are excited by balanced signals 180 degrees out of phase. The reference potential is established by a stabilized reference voltage applied at terminal 116. It should be noted that in this circuit the signal level remains constant at all rectifier inputs. Therefore, the biasing potentials at terminal 116 are all the same. As a result, to code $n$ digits, $n$–1 identical circuits of the type shown in FIG. 10 can be cascaded.

The symmetry coder as described in connection with FIGS. 7, 8 and 10 will normally generate $n$ digits simultaneously at $n$ readout points. It is possible to modify such a coder to make it geenrate $n$ digits consecutively at one readout point. The codes with which we are concerned are iterative from digit to digit and hence the circuit structure is also iterative. In FIG. 10, the $n-1$ circuits are completely identical. Therefore, instead of setting up $n-1$ such circuits in cascade, it is possible to set up a suitable arrangement that circulates the signal through one circuit $n-1$ times. A signal is applied to the circuit. Its polarity determines the first digit. The polarity of the pulse at the output 117 determines a second digit. This output signal is fed back to the input through delay line 118. When the feedback pulse reaches the input and is acted upon by the rectifying circuit, it produces a second output at terminal 117. The polarity of the second output at terminal 117 determines the third digit. This action continues until the pulse makes $n-1$ passes through the circuit, after which the feedback path is opened temporarily by switch 119 and then reclosed. The circuit is now ready for the next signal.

The above coding circuits have been concerned with coding signals into CP code. CP code signals may be directly decoded or converted into weighted binary and then decoded by one of the decoders described hereinafter. Along lines similar to that described above, it is possible to provide a coding circuit for weighted binary codes thereby eliminating the necessity of coding into CP and then converting to weighted binary. The circuits hereinbelow described are concerned with coding audio signals directly into weighted binary signals.

Figure 11:
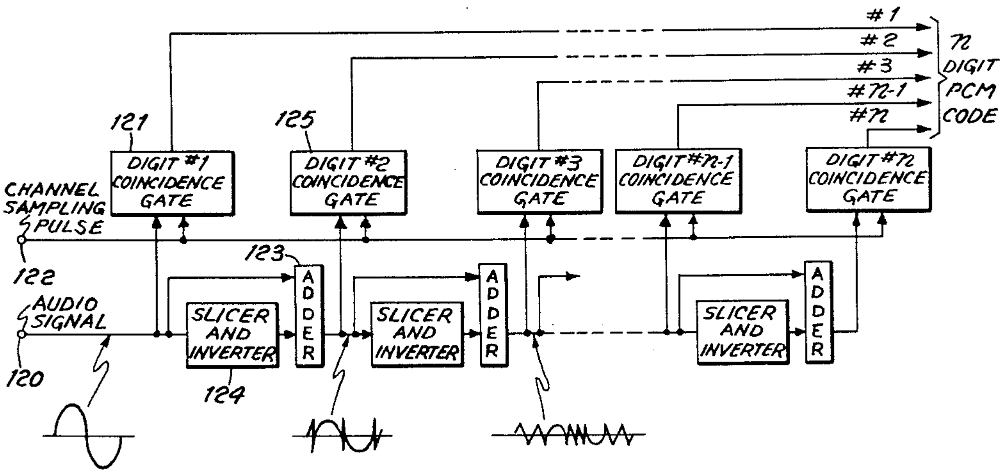
FIGS. 11, 12, 13 and 14 illustrate in schematic form several embodiments of PCM coders adapted to be employed in the system of this invention.

Referring to FIG. 11, an elementary weighted binary symmetry coder is disclosed that will perform the bisections and translations of the geometry of the code raster as described hereinabove. It will be remembered from that discussion that in accordance with the geometry of the code raster for weighted binary the greatest weight pulse is sent if the number being coded lies in the upper half of the code raster, that is, above line 67. Now visualize that the code raster is bisected at line 67. Now translate the lower half upward so that it is superimposed on the uper half. It will be noted that the next to the heaviest weight pulse is sent whenever the number being coded lies in the upper half of the resulting pattern, that is, above line 68. Additional bisections and translations along lines 69, 70 and 71 will yield the other four digits.

Consider sinusoidal signal wave applied at terminal 120 which is to be coded into weighted binary by an electrical circuit which performs the bisections and translations explained above. The signal is coupled to readout means or coincidence gates 121, coincidence gates 121 and the other coincidence gates being gated by the channel sampling pulses applied at terminal 122. The heaviest weight pulse is sent from gate 121 whenever the signal input is positive. The bisection and translation amounts to the following: Whenever the signal is positive it will not be altered and is applied directly from terminal 120 to adder 123. Whenever the signal is negative, a positive voltage equal to half the peak-to-peak range of the signal input will be added to the signal in adder 123. This can be accomplished by transmitting the signal through a slicer 124. The slicer 124 is a circuit which has an output that is a replica of a relatively small thin strip through the center of the signal waveform. The output of the slicer is inverted in polarity and amplified to a level corresponding to half the peak-to-peak input signal. Then the modified slicer output is added to the signal itself in added 123. The polarity of the sum will always be positive whenever the next heaviest weight pulse is to be sent from gate 125, and negative whenever that pulse is not to be sent. This means that the adder output is A.-C. coupled to the next circuit or equivalently that there has been subtracted from the first adder output 16 units. In this case A.-C. coupling does the job automatically without accurate reference potentials. This is in contrast with the CP coders described where D.-C. coupling and accurate reference potentials must be used.

The output signal of adder 123 is now sent through an identical arrangement of slicer and adder to obtain a readout for the third digit. The one difference in this case between the following circuits and the circuit just described is that the inverted slicer output signal is adjusted to be exactly half of its value for the preceding digit. The reason for this is that the peak-to-peak signal level is halved by each bisection and translation.

The signal outputs at the inputs to various readout points will of course be amplitude varying functions of time, not PCM pulses. To obtain PCM of the weighted binary type, the readouts should be simultaneously sampled in readout means 121 and 125 by the channel sampling pulse. Positive output of the sample indicates that the corresponding code digit is on while negative output indicates that the digit is off.

An example of the generation of a code number below the center line of the raster and a code number above the center line of the raster will now be presented to illustrate the operation of the PCM coders such as illustrated in FIG. 11.

The generation of code number 11 is demonstrated below. Consider the center line of the raster to correspond to 31.5 on the number scale and zero level of the input signal. Thus, the input signal has a voltage proportional to $-(31.5-11)=-20.5$.

| Slicer or Adder No. | Slicer Input | Slicer Output | DC coupled Adder Output | AC coupled Adder Output | Readout=Polarity of Slicer inputs: 1 if input to gate is+, 0 if input to gate is− |
|---|---|---|---|---|---|
| 1 | −20.5 | +32 | +11.5 | +11.5−16=−4.5 | 0 |
| 2 | −4.5 | +16 | +11.5 | +11.5− 8=+3.5 | 0 |
| 3 | +3.5 | 0 | +3.5 | +3.5− 4=−0.5 | 1 |
| 4 | −0.5 | +4 | +3.5 | +3.5− 2=+1.5 | 0 |
| 5 | +1.5 | 0 | +1.5 | +1.5− 2=+0.5 | 1 |
| 6 | +0.5 | -------- | -------- | -------------------- | 1 |

The generation of code number 43 is demonstrated below. The first slicer input voltage is proportional to $43-31.5=11.5$.

| Slicer or Adder No. | Slicer Input | Slicer Output | DC coupled Adder Output | AC coupled Adder Output | Readout=Polarity of Slicer inputs: 1 if input to gate is+, 0 if input to gate is− |
|---|---|---|---|---|---|
| 1 | +11.5 | 0 | +11.5 | +11.5−16=−4.5 | 1 |
| 2 | −4.5 | +16 | +11.5 | +11.5− 8=+3.5 | 0 |
| 3 | +3.5 | 0 | +3.5 | +3.5− 4=−0.5 | 1 |
| 4 | −0.5 | +4 | +3.5 | +3.5− 2=+1.5 | 0 |
| 5 | +1.5 | 0 | +1.5 | +1.5− 1=+0.5 | 1 |
| 6 | +0.5 | -------- | -------- | -------------------- | 1 |

The coder of FIG. 11 has shortcomings. However, it can be easily modified to obtain a much better arrangement. Referring to FIG. 11, it will be seen that the circuit consists of a cascade of $n-1$ almost identical circuits for an $n$ digit coder. The only difference between the circuits is that the signal level decreases by a 6 db for each circuit. The voltage added by the slicer inverter must also, therefore, decrease by 6 db since, as previously explained, the peak-to-peak output of the slicer inverters must equal half of the peak-to-peak signal level range at the adder input. Obviously, if a 6 db gain is inserted between circuits they can be completely identical. This will be the first modification. It adds no complexity since gain can be easily provided by the adder itself.

Figure 12:
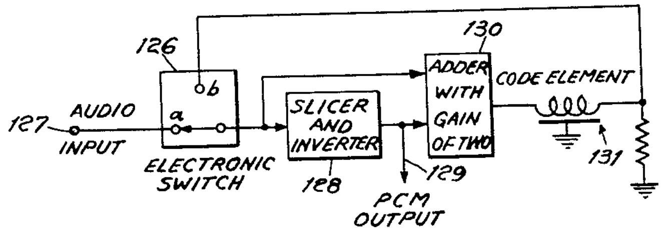

Now assume that instead of a sine wave being applied to the input, we apply a train of narrow PAM pulses representing sample values of a sine wave. For the duration of the sample conditions are exactly as before, and the polarity at the readout points during the sampling time will determine the $n$ digits. What we are now doing is sending each PAM pulse through $n-1$ identical circuits. The same result can be obtained by sending each PAM pulse through a single circuit $n-1$ times. It is necessary to delay each pulse for the duration of one code element in order to obtain the digits consecutively instead of simultaneously, as in the original system. Referring to FIG. 12, a block diagram of this version of the coder is illustrated. Switch 126 is a single pole-double throw electronic switch. At the beginning of the coding cycle switch 126 closes on position *a* for a one-code element interval. A narrow sample of the input audio wave at terminal 127, assumed constant during this interval, is taken. The polarity at the output of slicer 128 during this time indicates the presence or absence of the first digit at the readout point 129. Meanwhile, a signal voltage is immediately developed at the output of adder 130. The polarity of this signal will determine the second digit. The switch 126 which was closed on position *a* is thrown to position *b* at the beginning of the second code element. The adder output which has been traveling down the delay line 131 during the first digit has now reached position *b*. It immediately causes slicer 128 to assume a state appropriate to the condition of the second digit. Simultaneously, a new voltage is developed at the output of adder 130 and its polarity will eventually determine the third digit. The process continues with switch 126 closed on position *b* until the desired number of digits has been generated; then switch *s* closes on position *a* for the first code element of the next code group. This interrupts the feedback path through delay line 131 for one-code element, which is the recovery time of the coder, that is, the time required to dissipate the stored energy in the delay line from the preceding coding operation. The heaviest weight pulse of the second coding operation is generated during the recovery period.

Figure 13:
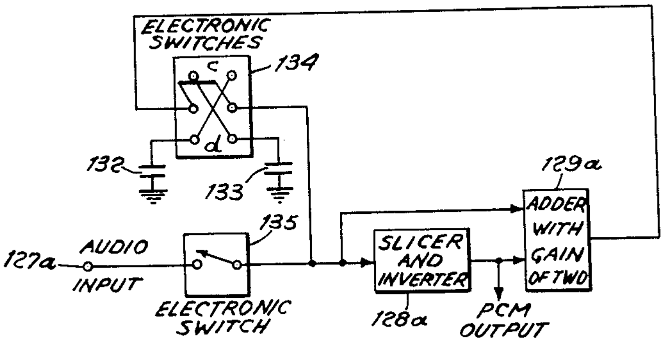

The coder of FIG. 12, while it is apparently a considerable simplification over the original version of FIG. 11, has drawbacks. First, there will be considerable difficulty in maintaining stable operation with a practical delay line. Part of this difficulty will result from the problem of maintaining the switch in accurate synchronism with the delay time. The delay line imperfections will at best limit the accuracy of coding, that is, the number of significant digits which can be generated. To avoid a delay line, a pair of storage capacitors 132 and 133 can be used substantially in the manner illustrated in FIG. 13. The input to the slicer 128a and 129a is relatively high, and the output impedance of the adder 129a and the audio source coupled to terminal 127a is assumed to be relatively low. At the beginning of the coding sequence, electronic switch 134 is set to position *c* and electronic switch 135 is momentarily closed. Capacitor 132 rapidly charges to the instantaneous value of the audio signal and it maintains this charge after switch 135 is open. Switch 134 remains in position *c* for one code element. The slicer 128a functions as a polarity detector and produces the first digit. The output of adder 129a is a function of the voltage on condenser 132, and is positive or negative if the second digit is on or off, respectively. Capacitor 133 is charged to this potential during the first code element. At the beginning of the second code element switch 134 is drawn to position *d*. This interchanges condensers 132 and 133 and condenser 132 rapidly charges to the new output of the adder while the charge on condenser 133 is maintained substantially constant. Slicer 128a now produces the second digit. The process continues with switch 134 being reversed at the beginning of each code element. Since switch 134 is reversed once every code element, it will start in the same state at the beginning of each coding operation if an even number of digits is being generated and in the opposite state if an odd number of digits is being generated. The coder will work just as well in either event. Switch 135 closes momentarily at the beginning of each coding operation and the charge on condenser 132 or condenser 133, depending upon the state of switch 134, is altered to correspond to the height of the new sample.

Electronically, the switching must be built up from single pole single throw elements. A total of five such switches is required. These switches must transmit signals of either polarity and they must be linear devices. The most promising electronic switch suitable for this application requires two diodes, a pulse transformer and a driver tube.

Figure 14:
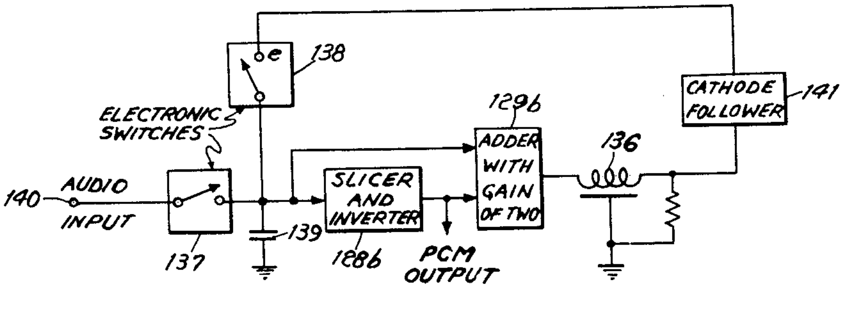

Referring to FIG. 14, there is illustrated an additional simplification of the weighted binary coder. Only two electronic switches are required, instead of five. The delay line 136 illustrated therein plays a completely different roll than in the coder of FIG. 12 and need not have unusually good characteristics.

Switch 137 is closed momentarily at the beginning of a coding operation and switch 138 is closed momentarily at the beginning of each code element in the coding operation, except that switch 138 is not closed at the same time that switch 137 is closed. The activation of switches 137 and 138 is respectfully accomplished by the 8 kc. and (48–8) kc. timing signals of FIG. 1. The time of closure of switches 137 and 138 is assumed to be a small fraction of a code element and somewhat less than the relay time of the delay line 136. Delay line 136 is then only a small fraction of a code element in length instead of exactly a code element as in FIG. 12. Low impedance sources are employed so that the storage capacitor 139 fully charges during the short interval that either switch 137 or switch 138 is closed.

Switch 137 closes for an instant and a sample of the audio wave applied at terminal 140 is stored on condenser 139. Slicer 128b reads the polarity of this signal which is the first digit. Adder 129b establishes an output, the polarity of which will eventually determine the second digit. After a short interval as determined by delay line 136, the adder output reaches the cathode follower 141 and terminal *e* of switch 138. At the beginning of the second code element switch 138 closes momentarily and condenser 139 is charged to the potential of terminal *e*. Switch 138 opens but condenser 139 retains the potential to which it has been charged. The slicer output now indicates the second digit. The output of adder 129 b is modified to a value the polarity of which determines the third digit, but the delay line prevents the potential of terminal *e* from being altered during the short interval that switch 138 is closed. The purpose of delay line 136 is now evident. If there were no delay in the system, at the instant switch 138 closed, the output of adder 129b would change and the voltage stored on condenser 139 would simultaneously change. When switch 138 is opened, the new voltage at the output of adder 129b would not be properly related to the original voltage stored on condenser 139, since the latter voltage had changed before an equilibrium had been reached. The delay line 136 can be very simple. An RC time constant may do. Better still is a series inductance driving the storage capacitor from a low impedance source. At the instant switch 138 closed, the inductance would prevent current flow.

With a single exception, all the required functions in the various embodiments of the coder described hereinabove with references to FIGS. 11, 12, 13 and 14 can be approximated with conventional circuits to a sufficient degree of accuracy. The difficult part is the slicer. This circuit must have a stable slicing level and it must be sensitive to signals of less than one half step in height to obtain accurate coding. Furthermore, it must have only two stable states with no possibility of reaching an intermediate equilibrium condition. A simple non-regenerative slicer will not satisfy the last condition. A bistable circuit, such as an Eccles-Jordan flip-flop, will satisfy this condition, but all such circuits have hysteresis. The input voltage at which the circuits trigger depends upon the state of the flip-flop. The hysteresis voltage must be made less than one half step height to obtain accurate coding. If one examines the design of such trigger circuits, it becomes evident that an attempt to reduce hysteresis leads to a design which is very poor from the view point of reliability. One method of effectively reducing hysteresis is to slice and amplify the signal one or more times before applying it to the trigger circuit. FIG. 1a illustrates a slicer which includes a plurality of squarers 171 and 172 having a schematic diagram as illustrated in squarer 171. Buffer amplifiers 173 and 174 are disposed as illustrated to restore the signal level. The final squarer 172 drives a phase splitter 175 whose outputs are used to position a positive locking device, no dead center, such as an Eccles-Jordan flip-flop 176. The purpose of cascading several squarers is to obtain an effective steepening of the input-output curve before the flip-flop 176 is actuated. In this way the hysteresis voltage range at the flip-flop input, referred to the initial signal input point, may be made vanishingly small.

*Decoder*

A simple decoder will be described herein which is suitable for converting one channel of multichannel PCM pulse train to audio. This decoder is tailored to meet the demands of the PCM system herein described wherein coding and decoding are performed for each voice channel rather than by the conventional means of going through an intermediate stage using multiplexed PAM.

Some method must be used for properly obtaining the correct relative weights of the various digits. Since we are considering a six-digit system, the accuracy of weighting must be good compared with one part in 64. Two methods are conventionally employed in decoding weighted binary PCM. In two known prior art decoders use is made of the transient response of properly designed networks when they are excited by PCM pulses. The transient decays according to a law wherein it loses 50 percent of its amplitude for every one code element time interval. This response is obtained in a first prior art circuit by means of a decaying exponential of suitable time constant or in a second prior art circuit by a combination of such an exponential and a suitably damped sine wave. In these types of decoders it is necessary to employ a PCM system wherein the pulses are sent in increasing order of weight. The proposed PCM system of this invention requires the more common sequence of decreasing order or weight in order to employ the simplified coding method described hereinabove under the heading "Coders."

Prior art systems employing a PCM pulse sequence of decreasing order of weight have employed a delay line tapped at code element intervals to decode the code group. At the time the least weight pulse is entering the line, the next to the least weight pulse is at the first tap, the next highest weight pulse is at the second tap and so on with the highest weight pulse at the matched receiving end of the line. The signals at the various taps are added by circuits which have attenuations that are adjusted so that each tap contributes an amount proportional to the weight of the pulse appearing there at the time that the six digits of one code group occupy the full length of the line.

It was shown that in the system of this invention, a considerable advantage in coding, multiplexing and demultiplexing is obtained if the digits of the various channels are interlaced instead of being sent in sequence of complete code groups. That is, it is proposed to send the 32 weight pulses of all channels in sequence, next the 16 weight pulses of all channels in sequence, etc. With this timing, the delay line decoder becomes impractical, because instead of one code element taps, one needs $n$ code number taps, where $n$ is the number of channels. The total length of a delay line is of the order of the sampling period of 125 microseconds.

The fundamental simplicity of the first prior art decoder mentioned above is so appealing that this method has been adapted to a situation where the pulses are sent in decreasing order of weight. Instead of decaying transients, growing transients are needed thus implying the use of positive feedback systems. Positive feedback systems often tend to be very critical and unstable. However, it has long been known that a suitable combination of positive and negative feedbacks can produce a very stable system. An example of this is the Wien bridge oscillator used in many precision low frequency applications.

Provisions for resetting the decoder must be made because the growing transients would build up and limit, making the decoder useless. It should be noted that the first and second prior art decoders also require reset, unless one can tolerate considerable crosstalk or unless one uses two decoders with each recovering in the operating time of the other.

Figure 15:
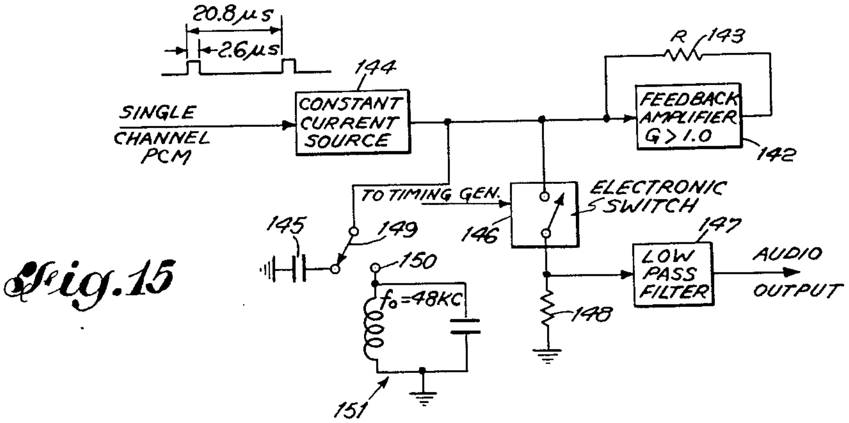
FIG. 15 illustrates in schematic form two embodiments of a PCM decoder adapted to be employed in the system of this invention.

The first prior art decoder for PCM is revised to handle PCM codes where the weights are in decreasing order by replacing the usual passive damped resistance with an electronically obtained negative resistance. This electronically obtained negative resistance is illustrated in FIG. 15 by feedback amplifier 142. Such a resistance, in a very stable form can be obtained by use of a negative feedback stabilized amplifier having its output in phase with its input. If one connects a resistance 143 from the input of amplifier 142 to its output, the input resistance will be found to be $$R_{in}=\frac{R}{1-G}$$

where G is equal to the gain of the amplifier.

When G is greater than one, this arrangement is a negative resistance. Single channel PCM pulses having a width of 2.6 microseconds and a repetitive interval of 20.8 microseconds, in accordance with the example of this invention, drive a constant current source 144 which supplies a current pulse of a fixed amount for each PCM input pulse. The current is fed into the RC network including the negative resistance of amplifier 142 and its feedback resistance 143 and the condenser 145. At sometime after the least weight pulse is received, capacitor 145 is sampled by electronic switch 146 and filter 147 extracts from this sampled voltage the audio signal output. Sampling switch 146 remains closed until shortly before the first digit of the next code group is to be applied. During this interval the capacitor 145 has been substantially fully discharged through resistance 148.

Another embodiment of the decoder of this invention can be illustrated by moving switch 149 to make contact with terminal 150 to thereby substitute the parallel LC circuit 151 for condenser 145. Thus, instead of using a growing exponential one can now use a growing sinusoidal to obtain less critical timing. Instead of simply a capacitor there is now employed a tuned LC circuit tuned to a frequency of 48 kc., for the example herein employed, which is the repetition rate of a code group of this simplified system. The sampling switch 146 is closed immediately after the last digit is received and remains closed until shortly before the first digit of the next code group is applied. Thus, the circuit is brought to the same initial state for each code group.

The decoder described is quite simple and requires few tubes. The constant current source 144 can be approximated by a pentode or a triode with cathode degeneration. A satisfactory feedback amplifier can be built with one dual triode. The sampling and reset switch requires two semi-conductor diodes, a triode driver, and a pulse transformer.

*Compander*

The need for a compander in the PCM of this invention has already been mentioned. Speech signals are characterized by very high crest factors, but it is the low level portions of speech which contribute most to intelligibility and speech quality. For this reason, a speech channel should faithfully reproduce small signals, but not necessarily high peaks. Since PCM quantizes amplitudes, it is important that the quanta be more closely spaced for small signals than for large signals, if good speech quality is to be obtained with a restricted number of total quanta. Either syllabic or instantaneous companders will do this job. However, if a single voice channel is to be further divided into amplitude modulated subchannels, a syllabic speech compander used under these conditions will generate crosstalk between the subchannels.

The choice must be made between a syllabic speech compander, to be switched out of the circuit when signals other than speech are transmitted or an instantaneous compander which is permanently part of the system. From the operational viewpoint, the latter is of course to be preferred since it does not require any coordinaiton between the operators of the multiplex equipment and the users of the telephone lines. In terms of relative complexity, it appears that an adqueate instantaneous compander will not require more tubes than a syllabic compander. This is of importance, since in the system of this invention companding must be accomplished separately for each channel. In the conventional PCM system, where multiplexd PAM is an intermediate step, there is an opportunity to use a compander common to all channels.

Figure 16:
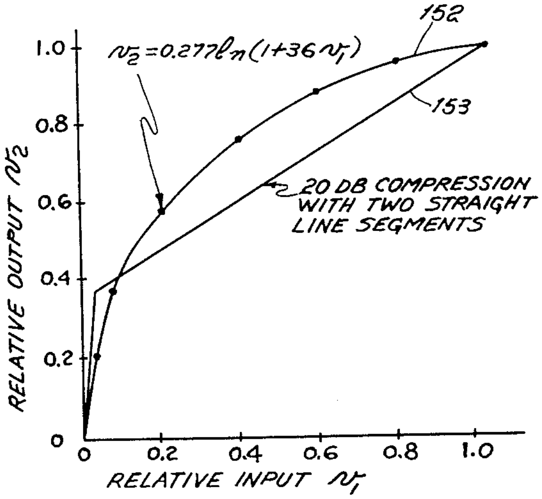
FIG. 16 illustrates the compression characteristic employed in the system of this invention.

In the past, the design of the compander has been considerably complicated by specification requirements that the companding closely approximates a true logarithmic curve, as is illustrated by curve 152 of FIG. 16. The logarithmic curve has the unique property that quantizing distortion, on a percentage basis, is independent of percentage modulation. Also the R.M.S. signal to quantizing distortion ratio is independent of the wave shape of the modulating signal. For these reasons, a logarithmic characteristic is sometimes thought of as being the optimum for all situations. Actually, this is not the case. For example, with full load test tone modulation, the introduction of 20 db logarithmic instantaneous companding increasees the quantizing distortion by 8 db. The optimum companding curve is determined by the amplitude distribution of the signal. The statistics of speech vary with many conditions and with the talker. Therefore, in this sense, there is no "best" companding curve for speech signals. It is necessary to use more closely spaced quanta for small signals than for large signals. This can be done just as well by the use of a two-slope straight line compander characteristic, as indicated by curve 153 of FIG. 16, as with a logarithmic compander characteristic. The distribution of steps between large and small signals can be controlled by adjusting the ratio of the slopes and by suitable choice of the point of intersection. Curves 152 and 153 are shown in FIG. 16 for comparison purposes. The logarithmic curve also has a 20 db characteristic. It is unlikely that any performance difference between these characteristics will be observed with speech signals.

The two-slope compander will require one envelope plus diodes per channel. This type of compander will now be discussed in greater detail and in connection with FIGS. 17 and 18.

It is to be understood that only one-half of the companding characteristic is shown in FIG. 16. It should be further understood that the complete characteristic has odd symmetry about the origin and that only the portion belonging in the first quandrant has been drawn. Both of the companding characteristics have been drawn as a compressor characteristic but it can be interpreted as an expander characteristic by interchanging the labeling of the coordinate axes.

Figure 17:
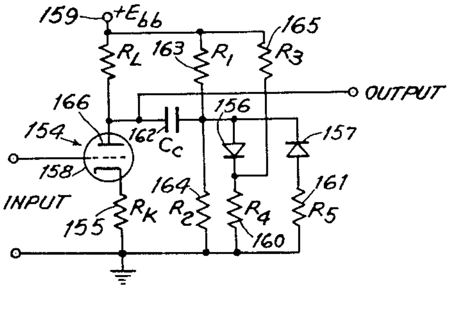
FIG. 17 illustrates in schematic form an embodiment of a compressor adapted to be employed in the system of this invention.

The basis circuit of the compressor is illustrated in FIG. 17. It consists of a conventional amplifier stage 154 with enough cathode degeneration supplied by resistor 155 to stabilize the circuit against variations in the amplifier tube. The stage has two gain conditions. One is obtained when neither of diodes 156 and 157 conducts and the other is obtained when either diode conducts. The conduction condition of diodes 156 and 157 is determined by the bias voltage applied thereto by the resistance network, including resistors 160, 161, 163, 164 and 165. This bias network thus establishes the slope of the two straight line segments of curve 153, FIG. 6. The output from the compressor is removed from anode 166 of tube 158.

The transition between the two states of gain is obtained when the output voltage is equal to the bias voltage of diodes 156 and 157. Note that if a unidirectional signal, such as a single ended PAM is applied to the circuit, only one diode conducts and a rectification bias is developed by condenser 162 which shifts the center of the compression characteristics. With balanced PAM or audio, the net charge entering condenser 162 via either of the two diode paths will be zero over one period of the modulation frequency. The center of compression will then always remain at the zero voltage point.

Precision, low temperature-coefficient resistors are required for the compressor circuit of FIG. 17. A regulated anode supply voltage coupled to terminal 159 is also needed.

Figure 18:
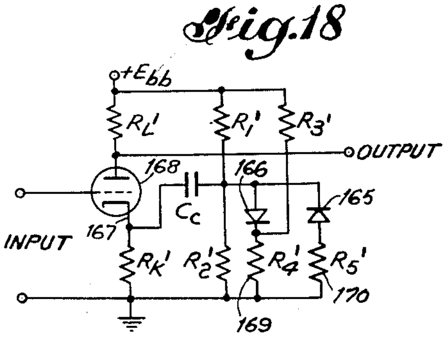
FIG. 18 illustrates in schematic form an embodiment of an expander adapted to be employed in the system of this invention.

As will be recognized the expander circuit of FIG. 18 is similar to the compressor with the exception that the diodes 165 and 166 are connected to the cathode 167 of electronic discharge device 168 instead of to the anode circuit as was the case in the circuit of FIG. 17. When the cathode load is reduced by the shunting action of resistors 169 and 170 and the diodes 166 and 165, the gain of the expander is increased.

The expander slopes and break point are determined by the requirement that the peak-to-peak characteristic of the compander must be linear. To achieve this result, the expander break point should match the compressor break point and the over-all gain should be independent of signal level.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for multiplexing a plurality of intelligence signals comprising means operating on each of said plurality of intelligence signals to simultaneously produce a code group of weighted pulses according to a given code having a given number of elements representing the instantaneous amplitude of each intelligence signal and means to sample the output of each of said last-mentioned means to dispose the same weight pulse of each of said code groups adjacent one another to form a multiplex pulse train.

2. A pulse code communication system comprising a plurality of intelligence signals, a coding means for each of said intelligence signals to provide a code group of weighted pulses having one of two amplitude conditions representing the instantaneous amplitude of an intelligence signal according to a binary code of a given number of elements, timing means coupled to each of said coding means to time the operataion thereof to produce the same weight pulse of each code group in succession, means coupled in common to the output of each of said coding means to time interleave the same weight pulse of each code group, means coupled to said common means to operate on a given pulse of one of said code groups to substitute synchronizing information therefor, transmitting means coupled to said last-mentioned means to transmit the resulting interleaved pulses over a propagataion medium, receiving means coupled to said propagation medium to receive said interleaved pulses, means coupled to said receiving means responsive to the synchronizing information substituted for said given pulse to generate a plurality of timing signals, separation means coupled in a given time relationship to said receiving means and in common to one of said timing signals to separate the pulses of each code group from said interleaved pulses, and decoding means coupled to each of said separation means and in common to another of said timing signals to produce from the separated pulses of each code group the original intelligence signals.

3. A pulse code communication system comprising a plurality of intelligence signals, a coding means for each of said intelligence signals to provide a code group of weighted pulses having one of two amplitude conditions representing the instantaneous amplitude of an intelligence signal according to a binary code of a given number of elements, each of said groups having decreasingly significant weighted pulses, timing means coupled to each of said coding means to time the operation thereof to produce same weight pulses of each of said code groups in succession, means coupled in common to the outputs of each of said coding means to dispose the same weight pulses of each code group in a time interleaved relationship, means coupled to said common means to operate on the least significant pulse of one of said code groups to substitute synchronizing information therefor, transmitting means coupled to said last-mentioned means to transmit the resulting interleaved pulses over a propagation medium, receiving means coupled to said propagation medium to receive said interleaved pulses, means coupled to said receiving means responsive to the synchronizing information of said last significant pulse to generate a plurality of timing signals, separation means coupled in a given time relationship to said receiving means and in common to one of said timing signals to separate the decreasingly significant pulses of each code group from said interleaved pulses, and decoding means coupled to each of said separation means and in common to another of said timing signals to produce from the separated pulses of each code group the original intelligence signals.

4. A pulse code communication system comprising a plurality of intelligence signals, a coding means for each of said intelligence signals to provide directly from said intelligence signal a code group of weighted pulses having one of two amplitude conditions representing the instantaneous amplitude of an intelligence signal according to a binary code of a given number of elements, timing means coupled to each of said coding means to time the operation thereof to produce the same weight pulse of each code group in succession, means coupled in common to the output of each of said coding means to time interleave the same weight pulse of each code group, means coupled to said common means to operate on a given pulse of one of said code groups to substitute synchronizing information thereof, transmitting means coupled to said last-mentioned means to transmit the resulting interleaved pulses over a propagation medium, receiving means coupled to said propagating medium to receive said interleaved pulses, means coupled to said receiving means responsive to the synchronizing information substituted for said given pulse to generate a plurality of timing signals, separation means coupled in a given time relationship to said receiving means and in common to one of said timing signals to separate the pulses of each code group from said interleaved pulses, and decoding means coupled to each of said separation means and in common to another of said timing signals to produce directly from the separated pulses of each code group the original intelligence signal.

5. A pulse code communication system comprising a plurality of intelligence signals, a coding means for each of said intelligence signals to provide a code group of weighted pulses having one of two amplitude conditions representing the instantaneous amplitude of an intelligence signal according to a binary code of a given number of elements, timing means coupled to each of said coding means to time the operation thereof to produce the same weight pulse of each code group in succession, means coupled in common to the output of each of said coding means to time interleave the same weight pulse of each code group, said interleaved pulses of each code group forming a signal frame repetitious at a given frequency, means coupled to said common means to remove a given pulse of one of said code groups of the interleaved code groups and substitute therefor a pulse timed to occur in every other one of said signal frames to provide synchronizing information.

6. In a pulse code communication system having a plurality of intelligence signals to be time interleaved into a multiplex signal frame, a multiplexer comprising a coder for each of said intelligence channels, a first source of timing signals having a repetitious period equal to the period of said signal frame, a second source of timing signals having a repetitious period equal to the period of said signal frame divided by the number of said intelligence signals, means coupling said first timing signal to each of said coders to simultaneously produce coextensive with the period of said first timing signal a code group of pulses having one of two amplitude conditions representing the instantaneous amplitude of their respective intelligence signals according to a binary code of a given number of code elements, a delay line having a length equal to the period of said second timing signal, output taps disposed along said delay line at space points equal to the period of said second timing signal divided by the number of code elements, means coupling the source of said second timing signal to said delay line for repetitious timed distribution from said output taps, a gate device coupled to the output of each of said coders, means coupling successive ones of said output taps to successive ones of said gate devices for sequential operation of said gate devices to pass therethrough in each period of said second timing signal the corresponding pulses of each code group, and means common to the output of each of said gate devices to time interleave the corresponding pulses of each code group to form a code element interlaced multiplex signal frame.

7. In a pulse code communication system having a plurality of intelligence signals to be time interleaved into a multiplex signal frame, a multiplexer comprising a coder for each of said intelligence channels, a first source of timing signals having a repetitious period equal to the period of said signal frame, a second source of timing signals having a repetitious period equal to the period of said signal frame divided by the number of said intelligence signals, means coupling said first timing signal to each of said coders to simultaneously produce coextensive with the period of said first timing signal a code group of pulses having one of two amplitude conditions representing the instantaneous amplitude of their respective intelligence signals according to a binary code of a given number of code elements, a delay line having a length equal to the period of said second timing signal, output taps disposed along said delay line at space points equal to the period of said second timing signal divided by the number of code elements, means coupling the source of said second timing signal to said delay line for repetitious timed distribution from said output taps, a gate device coupled to the output of each of said coders, means coupling successive ones of said output taps to successive ones of said gate devices for sequential operation of said gate devices to pass therethrough in each period of said second timing signal the corresponding pulses of each code group, means common to the output of each of said gate devices to time interleave the corresponding pulses of each code group to form a code element interlaced multiplex signal frame, a blanking gate coupled to said common means and the source of said first timing signal to blank the last code element of said signal frame, a flip-flop circuit responsive to said first timing signal, a gate device coupled to the source of said first timing signal and said flip-flop circuit to generate a synchronizing pulse for appearance in every other frame signal in place of the blanked out portion thereof, and means common to said last-mentioned gate device and said blanking gate to combine the outputs thereof.

8. A demultiplexer for a pulse code communication system carrying on communication by a multiplex pulse train including a plurality of binary code groups of pulses wherein the corresponding pulses of each code group are disposed adjacent each other and a synchronizing pulse, comprising a timing generator responsive to said synchronizing pulse to produce a timing signal having a repetitious period equal to the periods of said pulse train divided by the number of said code groups, a delay line having a length equal to the period of said timing signal, output taps disposed along said delay line having a spacing therebetween equal to the period of said timing signal divided by the number of pulses of said code groups, means to couple said pulse train to the input of said delay line for timed distribution from said output taps, code group separators coupled to each of said output taps, means to couple said timing signal to each of said separators to simultaneously separate said code groups from said pulse train.

9. In a pulse code modulation receiver receiving pulse trains consisting of regularly recurring frames including a pulse cyclically recurring in alternate ones of said pulse frames, a timing signal generator including at least one reflective delay line of given length exhibiting a resonant-like characteristic when excited by the cyclically recurring pulse of said pulse frames, means for impressing said pulse trains on the sending end of said delay line, and a wave shaping device coupled to the sending end of said delay line to produce in synchronism with the cyclically recurring pulse of said pulse train, a timing signal harmonically related to the cyclic rate of the cyclically recurring pulse.

10. In a pulse code modulation receiver receiving pulse trains including a pulse cyclically recurring in alternate ones of said pulse trains, a timing signal generator comprising a pair of constant current sources coupled in parallel to a common input for said pulse trains, a delay line at the output of each of said sources responsive to said alternately recurring pulse in said pulse trains, one of said delay lines having a time delay equal to a given fraction of the period of one pulse train and the other of said delay lines having a time delay equal to a second given fraction of the period of one pulse train, means shorting each of said delay lines, a full wave rectifier means coupled to the input of each of said delay lines, and a gate means coupled to the output of each of said rectifiers to produce at the output thereof a first timing signal in synchronism with said alternately recurring pulse having a period equal to the period of one pulse train.

11. In a pulse code modulation receiver receiving pulse trains including a pulse cyclically recurring in alternate ones of said pulse trains, a timing signal generator comprising a pair of constant current sources coupled in parallel to a common input for said pulse trains, a delay line at the output of each of said sources responsive to said alternately recurring pulse in said pulse trains, one of said delay lines having a time delay equal to a given fraction of the period of one pulse train and the other of said delay lines having a time delay equal to a second given fraction of the period of one pulse train, means shorting each of said delay lines, a full wave rectifier means coupled to the input of each of said delay lines, a gate means coupled to the output of each of said rectifiers to produce at the output thereof a first timing signal in synchronism with said alternately recurring pulse having a period equal to the period of one pulse train, a third constant current source coupled to the output of one of said rectifiers, an open ended delay line coupled to the output of said third source having a time delay equal to a third fraction of the period of one pulse train, and means coupled to the input of said open ended delay line to extract a second timing signal in synchronism with said alternately recurring pulse having a frequency equal to a given harmonic of said first timing signal.

12. A signal coder having a given maximum peak-to-peak signal range comprising an input terminal, an intelligence signal coupled to said input terminal disposed to have its zero axis in the center of said given signal range, circuit means coupled to said input terminal including means to bisect said given signal range and means to translate the intelligence signal to the center of one of the halves of the bisected given signal range, means in coupled relation to said circuit means to repeat the bisection and translation of the preceding bisected signal range a number of times equal to one less than the number of code elements of a code pulse group, and readout means to produce from the polarity of the voltage at said input terminal and the polarity of the signal after each bisection and translation on-off pulse code elements representing the amplitude of the signal input at a given instant.

13. A signal coder having a given maximum peak-to-peak signal range comprising an input terminal, an intelligence signal coupled to said input terminal disposed to have its zero axis in the center of said given signal range, a plurality of substantially identical circuit means equal to one less than the number of code elements of a code pulse group coupled in series relation with each other and said input terminal, the first of said circuit means including means to bisect said given signal range and means to translate the intelligence signal to the center of one of the halves of the bisected given signal range, each of the remaining circuit means including means to bisect the signal range of the preceding circuit means and means to translate the intelligence signal to one of the halves of the bisected signal range, and readout means coupled to said input terminal and the output terminal of each of said circuit means to produce on-off pulse code elements representing the amplitude of the signal input at a given instant, in accordance with the polarity of the voltages coupled to said readout means.

14. A signal coder having a given maximum peak-to-peak signal range comprising an input terminal, an intelligence signal coupled to said input terminal disposed to have its zero axis in the center of said given signal range, circuit means coupled to said input terminal including means to bisect said given signal range and means to translate the intelligence signal to the center of one of the halves of the bisected given signal range, a feedback arrangement from the output of said circuit means to said input terminal including means to delay the feedback by an amount equal to substantially the width of one pulse of said code group whereby the bisection and translation of the preceding bisected signal range is repeated a number of times equal to one less than the number of code elements of a code pulse group, and readout means to produce from the polarity of the voltage at said input terminal and the polarity of the signal at the output of said circuit means after each bisection and translation on-off pulse code elements representing the amplitude of the signal input at a given instant.

15. A signal decoder for decoding code signals of decreasingly significant pulses comprising an input terminal, a constant current source coupled to said input terminal, a negative resistance coupled to said current source, means coupled in shunt relation to said negative resistance intermediate said negative resistance and said current source to provide a growing current waveform, sampling means coupled in shunt relation to said last-mentioned means to sample the growing current waveform, and means coupled to said sampling means to obtain the intelligence carried by said code signal.

16. A signal decoder for decoding code signals of decreasingly significant pulses comprising an input terminal, a constant current source coupled to said input terminal, a negative feedback stabilized amplifier having a gain greater than one coupled to said current source, means coupled in shunt relation to said negative feedback amplifier intermediate said negative feedback amplifier and said current source to provide a growing current waveform, sampling means coupled in shunt relation to said last-mentioned means to sample the pulses of said code signal, and means coupled to said sampling means to obtain the intelligence carried by said code signal.

17. A pulse code communication system comprising a plurality of intelligence signal sources; a compressing means having a given response characteristic coupled to each of said intelligence signal sources to compress the intelligence signal in accordance with said given response characteristic; each of said compressing means including an amplitude translation device coupled to said intelligence signal source and having a normal given input-output characteristic, impedance means normally decoupled from said device, and means responsive to the intelligence signal of said intelligence signal source coupled to said device of either polarity above a given level for coupling said impedance means across said device to vary the input-output characteristic thereof to achieve said given response characteristic; a coding means coupled to each of said compressing means to provide a code group of pulses having one of two amplitude conditions representing the instantaneous amplitude of the compressed intelligence signal according to a binary code of a given number of elements; each of said coding means having a given maximum peak-to-peak signal range and including an input terminal, means to couple the compressed intelligence signal to said input terminal such that said compressed intelligence signal is disposed to have a zero axis in the center of said given signal range, circuit means coupled to said input terminal including means to bisect said given signal range and means to translate the compressed intelligence signal to the center of one of the halves of the bisected given signal range, means in coupled relation to said circuit means to repeat the bisection and translation of the preceding bisected signal range a number of times equal to one less than the number of code elements of a code pulse group, and readout means to produce from the polarity of the voltage at said input terminal and the plurality of the signal after each bisection and translation on-off pulse code elements representing the amplitude of the signal input at a given instance; timing means coupled to each of said coding means to time the operation thereof to produce the corresponding pulse of each code group in succession; means coupled in common to the output of each of the said coding means to time interleave the corresponding pulse of each code group; means coupled to said common means to operate on a given pulse of one of said code groups to substitute synchronizing information therefor; transmitting means coupled to said means coupled to said common means to transmit the resulting interleaved corresponding pulses over a propagation medium; receiving means coupled to said propagation medium to receive said interleaved pulses; means coupled to said receiving means responsive to the synchronizing information substituted for said given pulse to generate a plurality of timing signals; separation means coupled in a given time relationship to said receiving means and in common to one of said timing signals to separate the pulses of each code group from said interleaved pulse; decoding means coupled to each of said separation means and in common to another of said timing signals to produce from the separated pulses of each code group time the compressed intelligence signal thereof; each of said decoding means including an input terminal coupled to its corresponding separation means, a constant current source coupled to said signal input terminal, a negative resistance coupled to said current source, means coupled in shunt relation to said negative resistance intermediate said negative resistance and said current source to provide a growing current waveform, sampling means responsive to said another of said timing signals coupled in shunt relation to said means coupled in shunt relation to said negative resistance to sample the growing current waveform, and means coupled to said sampling means to obtain the intelligence carried by said code signal; and an expanding means having a response characteristic complementary to said given response characteristic coupled to the output of each of said decoding means to expand the intelligence signal output thereof to the original intelligence signal; each of said expanding means including an amplitude translation device having a given input-output characteristic coupled to its corresponding decoding means, means in said device for limiting the gain thereof, impedance means normally decoupled from said limiting means, and means responsive to the input voltage to said device above a given value for coupling said impedance means in shunt with said limiting means to increase the gain of said device.

References Cited in the file of this patent

UNITED STATES PATENTS

| | | |
|---|---|---|
| 2,156,846 | Getaz | May 2, 1939 |
| 2,421,025 | Grieg | May 27, 1947 |
| 2,498,678 | Grieg | Feb. 28, 1950 |
| 2,527,649 | Peterson | Oct. 31, 1950 |
| 2,572,900 | Winkler | Oct. 30, 1951 |
| 2,586,825 | Jacobson | Feb. 26, 1952 |
| 2,602,158 | Carbrey | July 1, 1952 |
| 2,610,295 | Carbrey | Sept. 9, 1952 |
| 2,617,879 | Sziklai | Nov. 11, 1952 |
| 2,636,081 | Feldman | Apr. 21, 1953 |
| 2,640,881 | Veaux | June 2, 1953 |
| 2,641,698 | Gloess | June 9, 1953 |
| 2,650,299 | Peterson | Aug. 25, 1953 |
| 2,664,462 | Bedford et al. | Dec. 29, 1953 |
| 2,664,504 | Bennett | Dec. 29, 1953 |
| 2,724,740 | Cutler | Nov. 22, 1955 |
| 2,744,960 | Grufhes et al. | May 8, 1956 |
| 2,760,008 | Schade | Aug. 21, 1956 |
| 2,768,352 | Von Sivers et al. | Oct. 23, 1956 |
| 2,786,100 | Earp | Mar. 19, 1957 |
| 2,786,892 | Arbon et al. | Mar. 26, 1957 |
| 2,798,118 | Van Tilburg | July 2, 1957 |
| 2,801,281 | Oliver et al. | July 30, 1957 |
| 2,806,950 | Carbrey | Sept. 17, 1957 |
| 2,832,827 | Metzger | Apr. 29, 1958 |
| 2,833,855 | Pages | May 6, 1958 |
| 2,837,719 | Albanese | June 3, 1958 |
| 2,852,610 | Levine | Sept. 16, 1958 |
| 2,857,465 | Schroeder | Oct. 21, 1958 |
| 2,902,542 | Treadwell | Sept. 1, 1959 |
| 2,927,965 | Waer | Mar. 8, 1960 |

OTHER REFERENCES

Feldman: "Multiplex Telephony," Bell Laboratories Record, published September 1948, pp. 364–376.